United States Patent
Zhang et al.

(10) Patent No.: US 11,239,980 B2
(45) Date of Patent: Feb. 1, 2022

(54) METHOD AND APPARATUS FOR TRANSMITTING PHYSICAL UPLINK SHARED

(71) Applicant: ZTE CORPORATION, Shenzhen (CN)

(72) Inventors: Wen Zhang, Shenzhen (CN); Shuqiang Xia, Shenzhen (CN); Wenfeng Zhang, Shenzhen (CN); Jing Shi, Shenzhen (CN); Xianghui Han, Shenzhen (CN); Chunli Liang, Shenzen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 328 days.

(21) Appl. No.: 16/338,435

(22) PCT Filed: Sep. 30, 2017

(86) PCT No.: PCT/CN2017/104946
§ 371 (c)(1),
(2) Date: Jan. 30, 2020

(87) PCT Pub. No.: WO2018/059589
PCT Pub. Date: Apr. 5, 2018

(65) Prior Publication Data
US 2020/0220698 A1    Jul. 9, 2020

(30) Foreign Application Priority Data
Sep. 30, 2016 (CN) .......................... 201610879778.3

(51) Int. Cl.
*H04L 5/00* (2006.01)
*H04W 76/11* (2018.01)
(Continued)

(52) U.S. Cl.
CPC .......... *H04L 5/0082* (2013.01); *H04L 5/0051* (2013.01); *H04L 5/10* (2013.01);
(Continued)

(58) Field of Classification Search
None
See application file for complete search history.

(56) References Cited

U.S. PATENT DOCUMENTS 10,651,980 B2 *  5/2020  Cao .................. H04L 1/1845
10,868,640 B2 * 12/2020  Cao .................. H04L 1/1887
(Continued)

FOREIGN PATENT DOCUMENTS

| CN | 103428777 A | 12/2013 |
|---|---|---|
| CN | 104022856 A | 9/2014 |

(Continued)

OTHER PUBLICATIONS

European Patent Office, Extended European Search Report dated Aug. 19, 2019 for EP17855039.8.
(Continued)

*Primary Examiner* — Ayaz R Sheikh
*Assistant Examiner* — Faiyazkhan Ghafoerkhan
(74) *Attorney, Agent, or Firm* — Li & Cai Intellectual Property (USA) Office

(57) ABSTRACT

Embodiments of the present invention provide a method and an apparatus for transmitting a physical uplink shared channel (PUSCH). The method includes: determining a time domain location for transmitting the PUSCH according to a downlink transmission time interval TTI for receiving a scheduling grant; and transmitting the PUSCH in the determined time domain location; wherein the scheduling grant comprises at least one of: indication information for indicating whether to transmit a demodulation reference signal DMRS; first time domain location related information for
(Continued)

Determine a time domain location for transmitting the PUSCH according to a downlink transmission time interval TTI for receiving a scheduling grant — S202

Transmit the PUSCH in the determined time domain location, wherein the scheduling grant includes at least one of the following information: indication information for indicating whether to transmit a demodulation reference signal DMRS; first time domain location related information for transmitting the demodulation reference signal DMRS; second time domain location related information for transmitting data; information on frequency domain density of the demodulation reference signal DMRS; and frequency domain offset information of the demodulation reference signal DMRS — S204 transmitting the demodulation reference signal DMRS; second time domain location related information for transmitting data; information on frequency domain density of the demodulation reference signal DMRS; and frequency domain offset information of the demodulation reference signal DMRS.

18 Claims, 6 Drawing Sheets

(51) Int. Cl.
| | | |
|---|---|---|
| H04W 76/27 | (2018.01) | |
| H04L 5/10 | (2006.01) | |
| H04L 27/26 | (2006.01) | |
| H04W 72/04 | (2009.01) | |
| H04W 72/12 | (2009.01) | |
| H04W 72/14 | (2009.01) | |

(52) U.S. Cl.
CPC ....... *H04L 27/2607* (2013.01); *H04W 72/042* (2013.01); *H04W 72/0446* (2013.01); *H04W 72/1268* (2013.01); *H04W 72/14* (2013.01); *H04W 76/11* (2018.02); *H04W 76/27* (2018.02)

(56) References Cited

U.S. PATENT DOCUMENTS

| | | | | |
|---|---|---|---|---|
| 2011/0188447 A1* | 8/2011 | Wang | ............. | H04L 5/0053 370/328 |
| 2013/0230000 A1* | 9/2013 | Wang | ............. | H04L 5/0053 370/329 |
| 2014/0369292 A1* | 12/2014 | Wu | ............. | H04W 72/04 370/329 |
| 2016/0029238 A1* | 1/2016 | Chen | ............. | H04W 72/042 370/252 |
| 2016/0094327 A1* | 3/2016 | Han | ............. | H04W 72/0413 370/329 |
| 2016/0095137 A1* | 3/2016 | Chen | ............. | H04L 25/0224 370/329 |
| 2016/0227573 A1* | 8/2016 | Quan | ............. | H04W 72/1289 |
| 2017/0111894 A1* | 4/2017 | Chen | ............. | H04L 5/0053 |
| 2019/0124675 A1* | 4/2019 | Gao | ............. | H04W 72/1268 |
| 2019/0289621 A1* | 9/2019 | Li | ............. | H04W 72/1268 |
| 2019/0313436 A1* | 10/2019 | Lee | ............. | H04W 72/042 |
| 2019/0342909 A1* | 11/2019 | Lee | ............. | H04L 5/0048 |
| 2020/0092874 A1* | 3/2020 | Kim | ............. | H04L 5/0094 |

FOREIGN PATENT DOCUMENTS

| | | |
|---|---|---|
| CN | 104468030 A | 3/2015 |
| CN | 105812105 A | 7/2016 |
| CN | 105898872 A | 8/2016 |
| EP | 3496481 A1 | 6/2019 |
| WO | 2012062085 A1 | 5/2012 |
| WO | WO 2016048593 A1 | 3/2016 |

OTHER PUBLICATIONS

Ericsson, "Definition of DCI bit fields for short TTI", 3GPP Draft, Mobile Mompetence Centre, vol. RAW WG1, No. Busan; Apr. 11-15, 2016, issued on Apr. 1, 2016, http://www.3gpp.org/ftp/tsg_ran/WG1_RL1/TSGR1_84b/Docs/.

* cited by examiner

METHOD AND APPARATUS FOR TRANSMITTING PHYSICAL UPLINK SHARED

CROSS REFERENCE

The present application is a continuing application of International Application No. PCT/CN2017/104946, filed on Sep. 30, 2017, which is based upon and claims priority to Chinese Patent Application No. 201610879778.3, filed on Sep. 30, 2016, and the entire contents thereof are incorporated herein by reference.

TECHNICAL FIELD

The present disclosure relates to the field of communication, and in particular to a method and an apparatus for transmitting a physical uplink shared channel PUSCH.

BACKGROUND

The rapid development of the mobile Internet and the Internet of Things has led to explosive growth of data traffic and the proliferation of diversified and differentiated services. As a new generation of mobile communication technology, compared to 4G, 5G will support higher speed (Gbps), massive link (1M/Km2), ultra-low latency (1 ms), higher reliability, and 100 times of energy efficiency improvement, in order to support new changes in demand. Here, ultra-low latency is a key indicator of 5G technology, which may directly affect development of latency-limited services such as vehicle networking, industrial automation, remote control, and smart grid. A series of current standards for 5G latency reduction are gradually being advanced.

The reduction of Transmission Time Interval (TTI) is an important research direction for the current latency reduction. It aims to reduce the TTI of the current 1 ms length to 0.5 ms or even 1~2 Orthogonal Frequency Division Multiplexing (OFDM) symbols, which can reduce the minimum scheduling time by multiple times, and in turn, can reduce the single transmission delay by multiple times without changing the frame structure. The 3rd Generation Partnership Project (3GPP) has also discussed the short TTI (short TTI) delay reduction technology. However, there is currently no effective solution for the uplink power control of the short TTI.

In the short TTI technique, since the TTI is relatively short, pilot overhead is relatively large. One way to reduce the pilot overhead is to have multiple TTIs share or reuse DMRS. However, in this way, how to determine the resources for transmitting DMRS and/or data is also a problem to be solved.

For the problem in the related art about effective determination of the resource for transmitting the PUSCH, an effective solution has not been proposed yet.

SUMMARY

Embodiments of the present disclosure provides a method and an apparatus for transmitting a physical uplink shared channel (PUSCH) to at least solve the problem in the related art that the resources of the PUSCH cannot be effectively determined.

According to an embodiment of the present disclosure, there is provided a method for transmitting a physical uplink shared channel PUSCH, including: determining a time domain location for transmitting the PUSCH according to a downlink transmission time interval TTI for receiving a scheduling grant; and transmitting the PUSCH in the determined time domain location; wherein the scheduling grant includes at least one of: indication information for indicating whether to transmit a demodulation reference signal DMRS; first time domain location related information for transmitting the demodulation reference signal DMRS; second time domain location related information for transmitting data; information on frequency domain density of the demodulation reference signal DMRS; and frequency domain offset information of the demodulation reference signal DMRS.

Optionally, when the second time domain location related information indicates an offset of a time domain location for transmitting the data from a time domain location for transmitting the DMRS, determining a time domain location for transmitting the PUSCH according to a downlink transmission time interval TTI for receiving a scheduling grant includes: determining the time domain location for transmitting the DMRS according to the downlink TTI and a designated time interval; and determining the time domain for transmitting the data according to the time domain for transmitting the DMRS and the second time domain location related information.

Optionally, determining a time domain location for transmitting the PUSCH according to a downlink transmission time interval TTI for receiving a scheduling grant includes: determining the time domain location for transmitting the DMRS according to the downlink TTI and a designated time interval; and determining the time domain location for transmitting the data according to the designated time interval and the second time domain location related information; wherein the second time domain location related information indicates one of: an offset of a time domain location for transmitting the data from a first designated uplink TTI, where the first designated uplink TTI is the first uplink TTI after the downlink TTI and having a time interval from the downlink TTI larger than or equal to the designated time interval; the information on the second domain information indicates that the time domain location of the data is the x-th uplink TTI after a first designated time domain location, where the first designated time domain location is a time domain location after the downlink TTI and offsetting from the downlink TTI by the designated time interval, and x is an integer; the time domain location of the data is the x1-th symbol after a first designated time domain location, where the first designated time domain location is a time domain location after the downlink TTI and offsetting from the downlink TTI by the designated time interval, and x1 is an integer.

Optionally, the second time domain location related information and at least one of the following information satisfy a preset first correspondence relationship: frequency domain offset information of the DMRS; and cyclic shift information of the DMRS.

Optionally, when the frequency domain offset information of the DMRS is not included in the scheduling grant, frequency domain offset information of the DMRS and/or cyclic shift information of the DMRS is notified by a base station through at least one of the following signaling: downlink control information DCI, radio resource control RRC, and a system information block SIB.

Optionally, the frequency domain offset information of the DMRS and the cyclic shift information of the DMRS are notified by the base station through the scheduling grant, or the cyclic shift information of the DMRS is notified by the base station through the scheduling grant.

Optionally, the frequency domain offset information of the DMRS and at least one of the following information satisfy a preset second correspondence relationship: the second time domain location related information for transmitting data; and the cyclic shift information of the DMRS.

Optionally, when the scheduling grant does not include the second time domain location related information for transmitting data, the second time domain location related information for transmitting data and the cyclic shift information of the DMRS is notified by the base station through at least one of the following signaling: downlink control information DCI, radio resource control RRC, and a system information Block SIB.

Optionally, the second time domain location related information for transmitting data and the cyclic shift information of the DMRS are notified by the base station through the scheduling grant, or the cyclic shift information of the DMRS is notified by the base station through the scheduling grant.

Optionally, determining a time domain location for transmitting the DMRS according to the downlink TTI for receiving the scheduling grant and the designated time interval includes one of: determining the time domain location for transmitting the DMRS as the y-th candidate DMRS time domain location starting from a second designated uplink TTI, where y is a positive integer, y is indicated by the first time domain location related information or is preset, and the second designated uplink TTI is the first uplink TTI after the downlink TTI and having a time interval from the downlink TTI larger than or equal to the designated time interval; and determining the time domain location for transmitting the DMRS as the y-th candidate DMRS time domain location after a second designated time domain location, where y is a positive integer, y is indicated by the first time domain location related information or y is preset, and the second designated time domain location is a time domain location after the downlink TTI and offsetting from the downlink TTI by the designated time interval.

Optionally, the candidate DMRS time domain location is preset or configured by a base station.

Optionally, the candidate DMRS time domain location includes one of the following: a preset symbol in each TTI; a preset symbol in a designated TTI; and a preset symbol in each sub-frame.

Optionally, the preset symbol in each TTI is the first symbol in each TTI; and/or, the preset symbol in the designated TTI is the first symbol in the designated TTI.

Optionally, the designated time interval is preset or notified by the base station eNB.

Optionally, the designated time interval includes N1 uplink TTIs, or includes N2 downlink TTIs, or includes N3 symbols, where N1 is an integer, N2 is an integer, and N3 is an integer.

Optionally, the method includes: when the time domain location for transmitting the DMRS and the time domain location for transmitting the data are on the same TTI, transmitting the data using all available symbols on the same TTI other than the symbol for transmitting the DMRS; and when the time domain location for transmitting the DMRS and the time domain location for transmitting the data are not on the same TTI, transmitting the data using all available symbols on the TTI for transmitting the data.

Optionally, determining a time domain location for transmitting the PUSCH according to the downlink TTI for receiving the scheduling grant includes: transmitting the DMRS on an uplink TTI with an index n+k, and transmitting the data on an uplink TTI with an index n+k+m, where n is an index of the downlink TTI, k is a non-negative integer, and m is an integer.

Optionally, the frequency domain offset information of the DMRS is a function of a cell radio network temporary identifier C-RNTI of an UE.

Optionally, when the scheduling grant includes at least two of the following information, the at least two of the following information is indicated by means of jointly encoding: information for indicating whether to transmit a DMRS; first time domain location related information for transmitting the DMRS; second time domain location related information for transmitting data; information on frequency domain density of the DMRS; and frequency domain offset information of the DMRS.

According to another aspect of the present disclosure, there is provided a method for receiving a physical uplink shared channel PUSCH, including: sending a scheduling grant to user equipment UE, wherein the scheduling grant is used by the UE to determine a time domain location for transmitting the PUS CH, the scheduling grant includes at least one of the following information: indication information indicating whether to transmit a demodulation reference signal DMRS; first time domain location related information for transmitting the demodulation reference signal DMRS; second time domain location related information for transmitting data; information on frequency domain density of the demodulation reference signal DMRS; and frequency domain offset information of the demodulation reference signal DMRS; and receiving a PUSCH transmitted by the UE on a determined time domain location for transmitting the PUSCH.

Optionally, when the second time domain location related information indicates an offset of a time domain location for transmitting the data from a time domain location for transmitting the demodulation reference signal DMRS, receiving a PUSCH transmitted by the UE on a determined time domain location for transmitting the PUSCH includes: receiving the DMRS transmitted by the UE on a time domain location for transmitting the DMRS, wherein the time domain location for transmitting the DMRS is determined by the UE according to the downlink Transmission Time Interval TTI for receiving the scheduling grant and the designating time interval; and receiving the data transmitted by the UE on a time domain location for transmitting the data, wherein the time domain location for transmitting the data is determined by the UE according to the time domain location for transmitting the DMRS and the second time domain location related information.

Optionally, receiving a PUSCH transmitted by the UE on a determined time domain location for transmitting the PUSCH includes: receiving a DMRS transmitted by the UE on a time domain location for transmitting the DMRS, wherein the time domain location for transmitting the DMRS is determined by the UE according to the downlink Transmission Time Interval TTI for receiving the scheduling grant and the designated time interval; and receiving the data transmitted by the UE on a time domain location for transmitting the data, wherein the time domain location for transmitting the data is determined by the UE according to the designated time interval and the second time domain location related information; wherein the second time domain location related information indicates one of: an offset of a time domain location for transmitting the data from a first designated uplink TTI, where the first designated uplink TTI is the first uplink TTI after the downlink TTI and having a time interval from the downlink TTI larger than or equal to the designated time interval; the second time domain location related information indicates that the time domain location for transmitting the data is the x-th uplink TTI after a first designated time domain location, where the first designated time domain location is a time domain location after the downlink TTI and offsetting from the downlink TTI by the designated time interval, and x is an integer; and the time domain location for transmitting the data is the x1-th symbol after the first designated time domain location, where the first designated time domain location is a time domain location after the downlink TTI and offsetting from the downlink TTI by the designated time interval, and x1 is an integer.

According to another aspect of the present disclosure, there is provided an apparatus for transmitting a physical uplink shared channel PUSCH, including: a determining module configured to determine a time domain location for transmitting the PUSCH according to a downlink transmission time interval TTI for receiving a scheduling grant; and a transmission module configured to transmit the PUSCH in the determined time domain location; wherein the scheduling grant includes at least one of the following information: indication information for indicating whether to transmit a demodulation reference signal DMRS; first time domain location related information for transmitting the demodulation reference signal DMRS; second time domain location related information for transmitting data; information on frequency domain density of the demodulation reference signal DMRS; and frequency domain offset information of the demodulation reference signal DMRS.

Optionally, the second time domain location related information indicates an offset of a time domain location for transmitting the data from a time domain location for transmitting the DMRS, the determining module includes: a first determining unit configured to determine the time domain location for transmitting the DMRS according to the downlink TTI and a designated time interval; and determine the time domain for transmitting the data according to the time domain for transmitting the DMRS and the second time domain location related information.

Optionally, the determining module includes: a second determining unit configured to determine a time domain location for transmitting the DMRS according to the downlink TTI and the designated time interval; and determine a time domain location for transmitting data according to the designated time interval and the second time domain location related information; and wherein the second time domain location related information indicates one of: an offset of a time domain location for transmitting the data from a first designated uplink TTI, where the first designated uplink TTI is the first uplink TTI after the downlink TTI and having a time interval from the downlink TTI larger than or equal to the designated time interval; the second time domain location related information indicates that the time domain location for transmitting the data is the x-th uplink TTI after a first designated time domain location, where the first designated time domain location is a time domain location after the downlink TTI and offsetting from the downlink TTI by the designated time interval, and x is an integer; and the time domain location for transmitting the data is the x1-th symbol after the first designated time domain location, where the first designated time domain location is a time domain location after the downlink TTI and offsetting from the downlink TTI by the designated time interval, and x1 is an integer.

According to another aspect of the present disclosure, there is provided an apparatus for receiving a physical uplink shared channel PUSCH, including: a transmission module configured to send a scheduling grant to the user equipment UE, wherein the scheduling grant is used by the UE to determine a time domain location for transmitting the PUSCH, the scheduling grant includes at least one of the following information: indication information indicating whether to transmit a demodulation reference signal DMRS; first time domain location related information for transmitting the demodulation reference signal DMRS; second time domain location related information for transmitting data; information on frequency domain density of the demodulation reference signal DMRS; and frequency domain offset information of the demodulation reference signal DMRS; a receiving module configured to receive a PUSCH transmitted by the UE on a determined time domain location for transmitting the PUS CH.

Optionally, when the second time domain location related information indicates an offset of a time domain location for transmitting the data from a time domain location for transmitting the demodulation reference signal DMRS, the receiving module includes: a first receiving unit configured to receive the DMRS transmitted by the UE on a time domain location for transmitting the DMRS, wherein the time domain location for transmitting the DMRS is determined by the UE according to the downlink Transmission Time Interval TTI for receiving the scheduling grant and the designating time interval; and receive the data transmitted by the UE on a time domain location for transmitting the data, wherein the time domain location for transmitting the data is determined by the UE according to the time domain location for transmitting the DMRS and the second time domain location related information.

Optionally, the receiving module includes: a second receiving unit configured to receive a DMRS transmitted by the UE on a time domain location for transmitting the DMRS, wherein the time domain location for transmitting the DMRS is determined by the UE according to the downlink Transmission Time Interval TTI for receiving the scheduling grant and the designated time interval; and receive the data transmitted by the UE on a time domain location for transmitting the data, wherein the time domain location for transmitting the data is determined by the UE according to the designated time interval and the second time domain location related information; wherein the second time domain location related information indicates one of: an offset of a time domain location of the data from a first designated uplink TTI, where the first designated uplink TTI is the first uplink TTI after the downlink TTI and having a time interval from the downlink TTI larger than or equal to the designated time interval; the second time domain location related information indicates that the time domain location for transmitting the data is the x-th uplink TTI after a first designated time domain location, where the first designated time domain location is a time domain location after the downlink TTI and offsetting from the downlink TTI by the designated time interval, and x is an integer; and the time domain location for transmitting the data is the x1-th symbol after the first designated time domain location, where the first designated time domain location is a time domain location after the downlink TTI and offsetting from the downlink TTI by the designated time interval, and x1 is an integer.

According to still another aspect of the present disclosure, there is provided a storage medium. The storage medium is configured to store program codes for performing the various steps described above.

According to still another embodiment of the present disclosure, there is also provided a processor for running a program, wherein the program is executed to perform the method of any of the above.

Through the present invention, since the information related to the PUSCH transmission is carried in the received scheduling grant, the PUSCH can be transmitted according to the TTI for receiving the scheduling grant and the information carried in the scheduling grant. Thus, the present disclosure can solve the problem in the related art that the resource for transmitting the PUSCH cannot be effectively determined, and thereby effectively determining the resources for transmitting the PUSCH.

BRIEF DESCRIPTION OF THE DRAWINGS

The drawings described herein are intended to provide a further understanding of the present disclosure, and are intended to be a part of the present disclosure. The illustrative embodiments of the present disclosure and the description thereof are intended to explain the present disclosure and are not intended to limit the present disclosure. In the drawing.

DETAILED DESCRIPTION

The present disclosure will be described in detail below with reference to the drawings in conjunction with the embodiments. It should be noted that the embodiments in the present application and the features in the embodiments may be combined with each other if such embodiments and features do not conflict with each other.

It is to be noted that the terms "first", "second", and the like in the specification and claims of the present disclosure are used to distinguish similar objects, and are not necessarily used to describe a particular order or sequence.

First Embodiment

Figure 1:
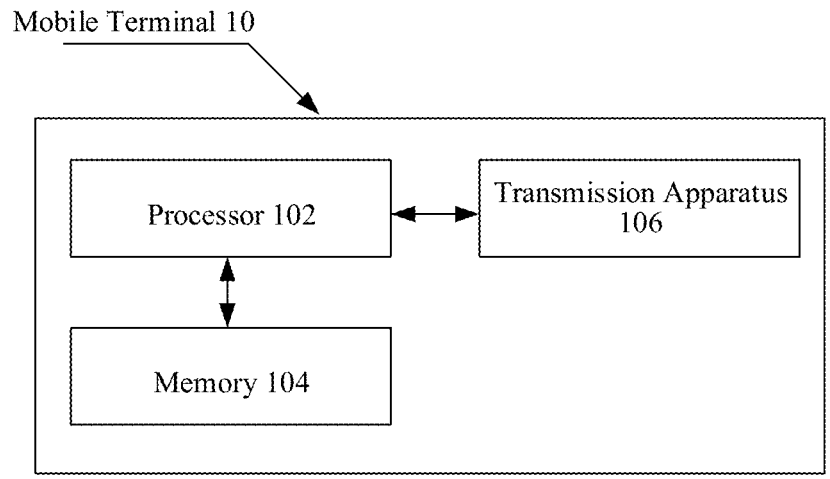
FIG. 1 is a block diagram showing a hardware structure of a mobile terminal for transmitting a physical uplink shared channel PUSCH according to an embodiment of the present disclosure.

A method embodiment provided in a first embodiment of the present application can be executed in a mobile terminal, a computer terminal or other computing apparatus. Taking a mobile terminal as an example, FIG. 1 is a block diagram showing a hardware structure of a mobile terminal for transmitting a physical uplink shared channel PUSCH according to an embodiment of the present disclosure. As shown in FIG. 1, a mobile terminal 10 may include one or more (only one is shown in FIG. 1) processors 102 (the processor 102 may include, but is not limited to, a processing apparatus such as a microprocessor MCU or a programmable logic device FPGA), a memory 104 configured to store data, and a transmission apparatus 106 configured with a communication function. It will be understood by those skilled in the art that the structure shown in FIG. 1 is merely illustrative and does not limit the structure of the above electronic apparatus. For example, the mobile terminal 10 may also include more or fewer components than those shown in FIG. 1, or have a different configuration than that shown in FIG. 1.

The memory 104 may be configured to store software programs and modules of an application software, such as program instructions/modules corresponding to the method for transmitting a physical uplink shared channel PUSCH in the embodiment of the present disclosure. The processor 102 runs the software programs and modules stored in the memory 104, to perform various functional applications and data processing, thus implementing the above method. The memory 104 may include a high speed random access memory, and may also include a non-volatile memory such as one or more magnetic storage devices, a flash memory, or other non-volatile solid state memory. In some examples, the memory 104 may further include storages remotely located relative to the processor 102. Such storages may be connected to mobile terminal 10 over a network. Examples of such network include, but not limited to, Internet, an intranet, a local area network, a mobile communication network, and a combination thereof.

The transmission apparatus 106 is configured to receive or transmit data via a network. The above-described specific examples of networks may include a wireless network provided by a communication provider of the mobile terminal 10. In one example, the transmission apparatus 106 includes a Network Interface Controller (NIC) that can be connected to other network devices through a base station to communicate with the Internet. In one example, the transmission apparatus 106 may be a Radio Frequency (RF) module configured to communicate with the Internet wirelessly.

Figure 2:
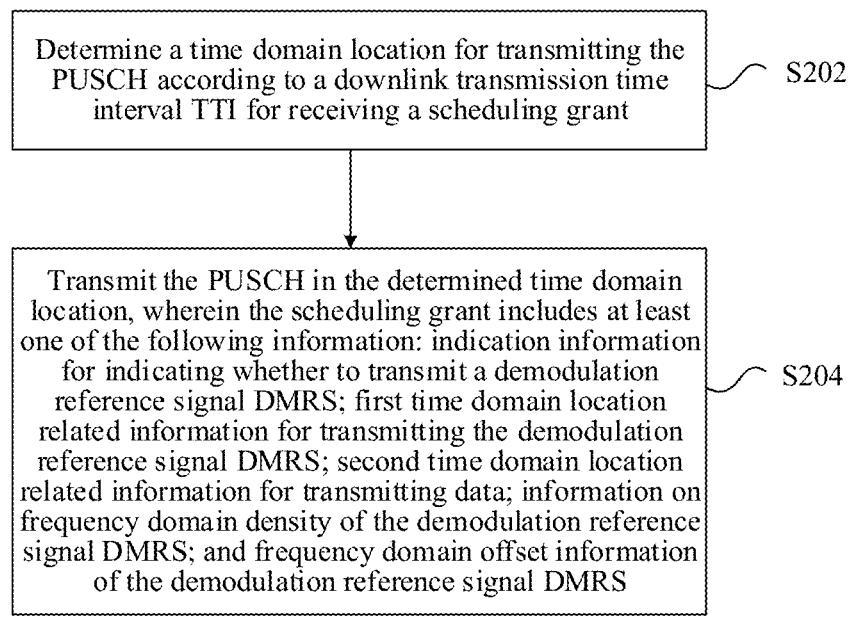
FIG. 2 is a flowchart of a method for transmitting a PUSCH according to an embodiment of the present disclosure.

In this embodiment, a method for transmitting a physical uplink shared channel (PUSCH) running on the mobile terminal as described above is provided. FIG. 2 is a flowchart of a method for transmitting a PUSCH according to an embodiment of the present disclosure. As shown in FIG. 2, the process includes the following steps.

In step S202, a time domain location for transmitting the PUSCH is determined according to a downlink transmission time interval TTI for receiving a scheduling grant.

In step S204, the PUSCH is transmitted in the determined time domain location. The scheduling grant includes at least one of the following information: indication information for indicating whether to transmit a demodulation reference signal DMRS (or for indicating whether to send a DMRS, in which "transmit" is intended to include "send", and in all of the embodiments below, "transmit" is also intended to include "send", and this will not be noted again); first time domain location related information for transmitting the demodulation reference signal DMRS (or referred to as first time domain location information for sending the DMRS);

second time domain location related information for transmitting data (or referred to as second time domain location information for sending data); information on frequency domain density of the demodulation reference signal DMRS; and frequency domain offset information of the demodulation reference signal DMRS.

The above embodiment may be performed by user equipment (UE).

In the above embodiment, the information carried in the scheduling grant may include at least one of the above five types of information. For example, the scheduling grant may include only information for indicating whether to transmit the DMRS and second time domain location related information for transmitting data. The rest information may be preagreed, or may be notified by the base station through other signaling, for example, Downlink Control Information (DCI), Radio Resource Control (RRC) and a System Information Block (SIB), other than the above-mentioned scheduling grant. In this embodiment, the information on the frequency domain offset of the DMRS and the second time domain location related information for transmitting data may have a correspondence relationship (the correspondence relationship may be designated by a protocol or determined otherwise). Therefore, the above scheduling grant may include only one of the information on the frequency domain offset of the DMRS and the second time domain location related information for transmitting data, and then the other one not included in the scheduling grant may be determined according to the correspondence relationship.

With the above-mentioned embodiments, the information related to the PUSCH transmission is carried in the received scheduling grant, so that the PUSCH can be transmitted according to the TTI for receiving the scheduling grant and the information carried in the scheduling grant. Thus, the present disclosure can solve the problem in the related art that the resource for transmitting the PUSCH cannot be effectively determined, and can thus achieve the effect of effectively determining the resources for transmitting the PUSCH.

In an optional embodiment, the second time domain location related information may be used to indicate different information. Below, how to determine the time domain location for transmitting the PUSCH when the second time domain location related information indicates different information will be explained.

When the second time domain location related information indicates an offset of a time domain location for transmitting the data from a time domain location for transmitting the DMRS, the time domain location for transmitting the PUSCH may be determined by the following means: determining the time domain location for transmitting the DMRS according to the downlink TTI and a designated time interval; and determining the time domain for transmitting the data according to the time domain for transmitting the DMRS and the second time domain location related information. In this embodiment, the second time domain location related information for transmitting data may specifically indicate an offset of a time domain location for transmitting the data from a time domain location for transmitting the DMRS.

When the second time domain location related information indicates one of: an offset of a time domain location for transmitting the data from a first designated uplink TTI, wherein the first designated uplink TTI is the first uplink TTI after the downlink TTI and having a time interval from the downlink TTI larger than or equal to the designated time interval; that the time domain location for transmitting the data is the x-th uplink TTI after a first designated time domain location, wherein the first designated time domain location is a time domain location after the downlink TTI and offsetting from the downlink TTI by the designated time interval, and x is an integer; and that the time domain location for transmitting the data is the x1-th symbol after the first designated time domain location, where the first designated time domain location is a time domain location after the downlink TTI and offsetting from the downlink TTI by the designated time interval, and x1 is an integer, the time domain location for transmitting the PUSCH may be determined by the following means: determining the time domain location for transmitting the DMRS according to the downlink TTI and the designated time interval; and determining the time domain location for transmitting the data according to the designated time interval and the second time domain location related information. It should be noted that the foregoing two methods for determining the time domain location for transmitting the PUSCH are two exemplary modes. In actual applications, other methods for determining the time domain location for transmitting the PUSCH may be applied.

It should be noted that, in various embodiments of the present disclosure, any reference to a time domain location offset may include a physical offset, and may also include a logical offset. For the foregoing embodiment, when the offset value is 1 TTI, the physical offset refers to that: the time domain location for transmitting the data is the TTI immediately after the time domain location for transmitting the DMRS, and the logical offset refers to that: the time domain location for transmitting the data is the first TTI available after the time domain location for transmitting the DMRS (the first available TTI enables the second TTI after the time domain location for transmitting the DMRS).

In an optional embodiment, the second time domain location related information may satisfy a preset first correspondence relationship with at least one of the following information (in other words, the second time domain location related information may be determined by at least one of the following information): frequency domain offset information of the DMRS; and cyclic shift information of the DMRS. In this embodiment, the second time domain location related information may not be included in the scheduling grant. In this case, the second time domain location related information has to be determined by other means, for example, determined from the frequency domain offset information of the DMRS and/or the cyclic shift information of the DMRS. The frequency domain offset information of the DMRS and/or the cyclic shift information of the DMRS may be included in the scheduling grant to be notified to the terminal, or may be predetermined. It should be noted that, the second time domain location related information may be carried in the scheduling grant, or determined from the frequency domain offset information of the DMRS and/or the cyclic shift information of the DMRS, and in addition to those, the second time domain location related information may also be predetermined and designated, or may be notified to the terminal by the base station through other signaling, including but not limited to at least one of DCI, RRC, and SIB.

In an optional embodiment, when the frequency domain offset information of the DMRS is not included in the scheduling grant, the frequency domain offset information of the DMRS and/or the cyclic shift information of the DMRS may be notified by the base station through at least one of the following signaling: Downlink Control Information DCI (may be the scheduling grant, or may be other DCI signaling), Radio Resource Control RRC and a System Information Block SIB.

In an optional embodiment, the frequency domain offset information of the DMRS and the cyclic shift information of the DMRS may be notified by the base station through the scheduling grant, or the cyclic shift information of the DMRS may be notified by the base station through the scheduling grant.

In an optional embodiment, the frequency domain offset information of the DMRS may be determined by at least one of the following information (or the frequency domain offset information of the DMRS and at least one of the following information satisfies a preset second correspondence relationship): second time domain location related information for transmitting data; and the cyclic shift information of the DMRS. Similarly, in this embodiment, the frequency domain offset information of the DMRS may not be included in the scheduling grant. In this case, the frequency domain offset information of the DMRS may be determined by other means. For example, the frequency domain offset information of the DMRS may be determined from the second time domain location related information and the cyclic shift information of the DMRS, where the second time domain location related information and the cyclic shift information of the DMRS may be included in the scheduling grant to be notified to the terminal, or may be predetermined. It should be noted that the frequency domain offset information of the DMRS may also be predetermined or designated, or may be notified to the terminal by the base station through other signaling, including but not limited to, at least one of DCI, RRC, and SIB.

In an optional embodiment, the second time domain location related information for transmitting data and/or the cyclic shift information of the DMRS may be notified by the base station through at least one the following signaling: Downlink Control Information DCI (may be the scheduling grant, or may be other DCI signaling), Radio Resource Control RRC and a System Information Block SIB. In this embodiment, the second time domain location related information may not be carried in the scheduling grant, and may be notified by at least one of the signaling when the second time domain location related information is not carried in the scheduling grant.

In an optional embodiment, the second time domain location related information for transmitting data and the cyclic shift information of the DMRS, or the cyclic shift information of the DMRS may be notified by the base station through the scheduling grant. That is, the information on the time domain location and the cyclic shift information of the DMRS, or the cyclic shift information of the DMRS may be carried in the scheduling grant to be notified to the terminal.

In an optional embodiment, determining a time domain location for transmitting the DMRS according to the downlink TTI for receiving the scheduling grant and the designated time interval includes one of the following manners.

In a first manner, the time domain location for transmitting the DMRS may be determined as the y-th candidate DMRS time domain location starting from a second designated uplink TTI, where y is a positive integer, y is indicated by the first time domain location related information or preset, and the second designated uplink TTI is the first uplink TTI after the downlink TTI and having a time interval from the downlink TTI larger than or equal to the designated time interval.

In a second manner, the time domain location for transmitting the DMRS may be determined as the y-th candidate DMRS time domain location after a second designated time domain location, where y is a positive integer, y is indicated by the first time domain location related information or is preset, and the second designated time domain location is a time domain location after the downlink TTI and offsetting from the downlink TTI by the designated time interval.

In an optional embodiment, the candidate DMRS time domain location is preset or configured by a base station.

In an optional embodiment, the candidate DMRS time domain location includes one of: a preset symbol in each TTI; a preset symbol in the designated TTI; and a preset symbol in each subframe. Optionally, the preset symbol in each TTI may be the first symbol in each TTI. Optionally, the preset symbol in the designated TTI may be the first symbol in the designated TTI. In this embodiment, the candidate DMRS time domain location may be each uplink symbol in addition to the above-mentioned several symbols. That is, all uplink symbols may be used as candidate DMRS time domain locations.

In an optional embodiment, the designated time interval may be preset or notified by the base station. It should be noted that the above two manners for determining the designated time interval are only two exemplary manners, and the designated time interval may be negotiated between the base station and the terminal or manually configured, which will not repeated herein.

In an optional embodiment, the designated time interval may include N1 uplink TTIs, or may include N2 downlink TTIs, or may include N3 symbols, where N1 is an integer, N2 is an integer, and N3 is an integer. In this embodiment, the value of N1 may be indicated by the base station or preset, the value of N2 may be indicated by the base station or preset, and the value of N3 may be indicated by the base station or preset.

In an optional embodiment, when the time domain location for transmitting the DMRS and the time domain location for transmitting the data are on the same TTI, all available symbols other than the symbol for transmitting the DMRS on the same TTI are used for transmitting the data. When the time domain location for transmitting the DMRS and the time domain location for transmitting the data are not on the same TTI, all available symbols on the TTI for transmitting the data are used for transmitting the data.

In an optional embodiment, on the TTI for transmitting the data, when there is a symbol for transmitting the sounding reference signal SRS, the available symbols may include symbols other than the symbol for transmitting the SRS. That is, the available symbols do not include the symbol for transmitting the SRS. Here, the symbol for transmitting the SRS may be a cell-specific symbol for transmitting the SRS, or a UE-specific symbol for transmitting the SRS.

In an optional embodiment, determining a time domain location for transmitting the PUSCH according to the downlink TTI for receiving the scheduling grant includes: transmitting the DMRS on an uplink TTI with an index n+k, and transmitting the data on an uplink TTI with an index n+k+m, where n is an index of the downlink TTI, k is a non-negative integer, and m is an integer. In this embodiment, there is a fixed correspondence relationship between the TTI for receiving the scheduling grant and the TTI for transmitting the DMRS and the TTI for transmitting the data, so that the PUSCH transmission can be performed according to the fixed correspondence relationship.

In an optional embodiment, the frequency domain offset information of the DMRS may be a function of a cell radio network temporary identifier C-RNTI of the UE.

In an optional embodiment, when the scheduling grant includes at least two of the following information, the at least two of the following information may be indicated by jointly encoding: information for indicating whether to transmit a DMRS; first time domain location related information for transmitting the DMRS; second time domain location related information for transmitting data; information on frequency domain density of the DMRS; and frequency domain offset information of the DMRS.

Figure 3:
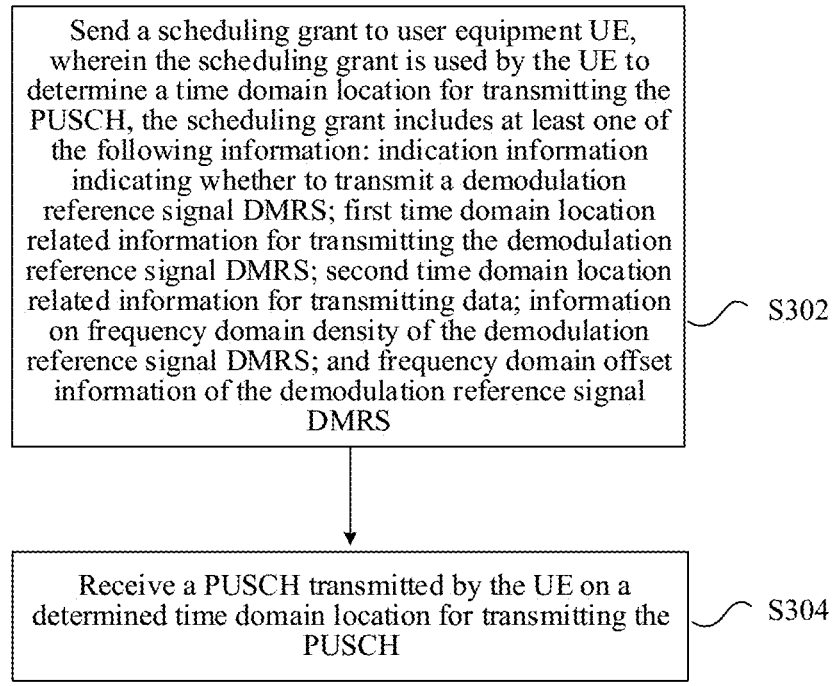
FIG. 3 is a flowchart of a method for receiving a PUSCH according to an embodiment of the present disclosure.

An embodiment of the present disclosure also provides a method for receiving a physical uplink shared channel PUSCH. FIG. 3 is a flowchart of a method for receiving a PUSCH according to an embodiment of the present disclosure. As shown in FIG. 3, the process includes the following steps.

In step S302, a scheduling grant is sent to user equipment UE. The scheduling grant is used by the UE to determine a time domain location for transmitting the PUSCH, the scheduling grant includes at least one of the following information: indication information indicating whether to transmit a demodulation reference signal DMRS; first time domain location related information for transmitting the demodulation reference signal DMRS; second time domain location related information for transmitting data; information on frequency domain density of the demodulation reference signal DMRS; and frequency domain offset information of the demodulation reference signal DMRS.

In step S304, a PUSCH transmitted by the UE on a determined time domain location for transmitting the PUSCH is received.

The above embodiment may be performed by a base station eNB.

In the above embodiment, the information carried in the scheduling grant may include at least one of the above five types of information. For example, the scheduling grant may include only information for indicating whether to transmit the DMRS and second time domain location related information for transmitting data. The rest information may be predetermined, or may be notified to the UE by the base station through other signaling, for example, Downlink Control Information (DCI), Radio Resource Control (RRC) and a System Information Block (SIB), other than the above-mentioned scheduling grant. In this embodiment, the information on the frequency domain offset of the DMRS and the second time domain location related information for transmitting data may have a correspondence relationship (the correspondence relationship may be designated by a protocol or determined otherwise). Therefore, the above scheduling grant may include only one of the information on the frequency domain offset of the DMRS and the second time domain location related information for transmitting data, and then the other one not included in the scheduling grant may be determined according to the correspondence relationship.

With the above-mentioned embodiments, the information related to the PUSCH transmission is carried in the scheduling grant, so that the UE can transmit the PUSCH according to the TTI for receiving the scheduling grant and the information carried in the scheduling grant. Thus, the present disclosure can solve the problem in the related art that the resource for transmitting the PUSCH cannot be effectively determined, and can thus achieve the effect of effectively determining the resources for transmitting the PUSCH.

In an optional embodiment, the second time domain location related information may be used to indicate different information. Below, how to determine the time domain location for transmitting the PUSCH when the second time domain location related information indicates different information will be explained.

When the second time domain location related information indicates an offset of a time domain location for transmitting the data from a time domain location for transmitting the demodulation reference signal DMRS, receiving a PUSCH transmitted by the UE on a determined time domain location for transmitting the PUSCH includes: receiving the DMRS transmitted by the UE on a time domain location for transmitting the DMRS, wherein the time domain location for transmitting the DMRS is determined by the UE according to the downlink Transmission Time Interval TTI for receiving the scheduling grant and the designating time interval; and receiving the data transmitted by the UE on a time domain location for transmitting the data, wherein the time domain location for transmitting the data is determined by the UE according to the time domain location for transmitting the DMRS and the second time domain location related information.

When the second time domain location related information indicates one of: an offset of a time domain location for transmitting the data from a first designated uplink TTI, and the first designated uplink TTI is the first uplink TTI after the downlink TTI and having a time interval from the downlink TTI larger than or equal to the designated time interval; the second time domain location related information is transmitted to indicate that the time domain location for transmitting the data is the x-th uplink TTI after a first designated time domain location, and the first designated time domain location is a time domain location after the downlink TTI and offsetting from the downlink TTI by the designated time interval, and x is an integer; and the time domain location for transmitting the data is the x1-th symbol after the first designated time domain location, where the first designated time domain location is a time domain location after the downlink TTI and offsetting from the downlink TTI by the designated time interval, and x1 is an integer. Receiving a PUSCH transmitted by the UE on a determined time domain location for transmitting the PUSCH includes: receiving a DMRS transmitted by the UE on a time domain location for transmitting the DMRS, wherein the time domain location for transmitting the DMRS is determined by the UE according to the downlink Transmission Time Interval TTI for receiving the scheduling grant and the designated time interval; and receiving the data transmitted by the UE on a time domain location for transmitting the data, wherein the time domain location for transmitting the data is determined by the UE according to the designated time interval and the second time domain location related information.

In an optional embodiment, the base station may further receive the PUSCH transmitted by the UE after determining the time domain location for transmitting the PUSCH by one of the following manners.

In a first manner, the UE may determine the time domain location for transmitting the DMRS as the y-th candidate DMRS time domain location starting from a second designated uplink TTI, where y is a positive integer, y is indicated by the first time domain location related information or preset, and the second designated uplink TTI is the first uplink TTI after the downlink TTI and having a time interval from the downlink TTI larger than or equal to the designated time interval.

In a second manner, the UE may determine the time domain location for transmitting the DMRS as the y-th candidate DMRS time domain location after a second designated time domain location, where y is a positive integer, y is indicated by the first time domain location related information or preset, and the second designated time domain location is the time domain location after the downlink TTI and offsetting from the downlink TTI by the designated time interval.

It should be noted that the candidate DMRS time domain location in the embodiment may be preset or may be configured by the base station for the UE. Optionally, the candidate DMRS time domain location includes one of the following: a preset symbol in each TTI; a preset symbol in the designated TTI; and a preset symbol in each subframe. Optionally, the preset symbol in each TTI is the first symbol in each TTI; and/or, the preset symbol in the designated TTI is the first symbol in the designated TTI.

The designated time interval in the above embodiment may be preset or sent to the UE by the base station eNB. Optionally, the designated time interval may include N1 uplink TTIs, or include N2 downlink TTIs, or include N3 symbols, where N1 is an integer, N2 is an integer, and N3 is an integer.

In an optional embodiment, the base station may further receive the PUSCH transmitted by the UE after determining the time domain location for transmitting the PUSCH by one of the following manners.

Manner 1: When the time domain locations used by the UE side for transmitting the DMRS and for transmitting data are on the same TTI, the UE may use all available symbols on the same TTI other than the symbol for transmitting the DMRS to transmit the data.

Manner 2: When the time domain locations used by the UE side for transmitting the DMRS and for transmitting data are not on the same TTI, the UE may transmit the data using all available symbols on the TTI for transmitting the data.

It should be noted that, in the above embodiment, on the UE side, on the TTI for transmitting the data, when there is a symbol for transmitting the sounding reference signal SRS, the available symbols may include symbols other than the symbol for transmitting the SRS.

In an optional embodiment, the base station may further receive the PUSCH transmitted by the UE after determining the time domain location for transmitting the PUSCH by one of the following manners.

The UE transmits the DMRS on an uplink TTI with an index n+k, and transmits the data on an uplink TTI with an index n+k+m, where n is the index of the downlink TTI, k is a non-negative integer, and m is an integer.

In an optional embodiment, when at least two of the following information are included in the scheduling grant indicated by the base station, the at least two of the following information may be indicated to the UE by means of jointly encoding: information for indicating whether to transmit a DMRS; first time domain location related information for transmitting the DMRS; second time domain location related information for transmitting data; information on frequency domain density of the DMRS; and frequency domain offset information of the DMRS. The implementation of the specific joint indication can be seen in detail in a specific embodiments described later.

It should be noted that the solutions proposed in the embodiments of the present disclosure can be applied but not limited to the short TTI technology.

The present disclosure will be described below in conjunction with specific embodiments.

Embodiment 1

In this embodiment, a method for transmitting information is provided. The method in this embodiment can be used for uplink or downlink, and can be used for a control channel or a data channel. An example of an uplink data channel and a short TTI system will be described below. It should be noted that the method provided in this embodiment is not limited to the short TTI technology.

In this embodiment, a Long-Term Evolution (LTE) subframe may be divided into a plurality of TTIs according to a preset manner. For example, in a related art, one subframe in the LTE system includes 14 OFDM symbols or single-carrier frequency-division multiple access (SC-FDMA) symbols. Assuming that every 2 symbols are divided into one TTI in a chronological order, 14 symbols can be divided into 7 TTIs. Alternatively, when dividing the TTIs, the TTIs may also be of unequal lengths. For example, one time slot is divided into three TTIs, and the number of symbols included in a TTI resulted from division in a chronological order may be 3, 2, and 2, respectively. In this embodiment, the division of the TTIs may be non-overlapping, that is, each symbol belongs to only one TTI. The division of the TTIs may also be overlapping, for example, the first and second symbols in one subframe belong to TTI#0 (i.e., a TTI with an index 0, and in the present disclosure, TTI#i indicates a TTI with an index i, which will not be repeated later), and the second and third symbols belong to TTI#1. In this case, there is one symbol overlapping between TTI#0 and TTI#1. In the embodiment of the present disclosure, the method for dividing the TTIs is not limited, and is not limited to the above examples. The description herein is also applicable to other embodiments of the present disclosure.

In this embodiment, the divisions of the uplink and downlink TTIs may be the same. For example, for both of the uplink and downlink, 14 symbols in one subframe are divided into 7 TTIs. The divisions of the uplink and downlink TTIs may alternatively be different. For example, for the downlink, 14 symbols in one subframe are divided into 7 TTIs, and for the uplink, 14 symbols in one subframe are divided into 2 TTIs. The present disclosure is not limited thereto. The description herein can also be used in other embodiments of the present disclosure.

The following description will be given below for the case where the divisions of the uplink and downlink TTIs are the same.

It is assumed that the candidate location of the DMRS is a preset symbol of each TTI, such as the first symbol of each TTI.

It is assumed that the UE receives an uplink grant UL grant (which may be referred to as an uplink grant, which corresponds to the above scheduling grant) on a TTI#n, and the location for sending the DMRS by the UE may be determined from a designated time interval, for example, TTI#n+k. The location for sending data by the UE may be TTI#n+k+m. Here, the interval between the TTI for receiving the uplink grant and the TTI for sending the DMRS is k−1 TTIs. The TTI for sending the DMRS is the first TTI after the designated interval, that is, the first candidate location for the DMRS. That is, the UE can determine the location for sending the DMRS according to n+k, and determine the location for sending the data according to n+k+m, where k and m are integers, k may be preset or indicated by the eNB. For example, k may be preset as a minimum timing, for example, k may be preset to be 4, or notified by an eNB, where the eNB may notify the value of k to the UE through a System Information Block (SIB) or Radio Resource Control (RRC) signaling or downlink control information (DCI). m can be indicated through DCI. For example, m can have 4 values, which are 0, 1, 2, and 3 respectively. The resource location for sending the DMRS and data will be described below with reference to the accompanying drawings.

Figure 4:
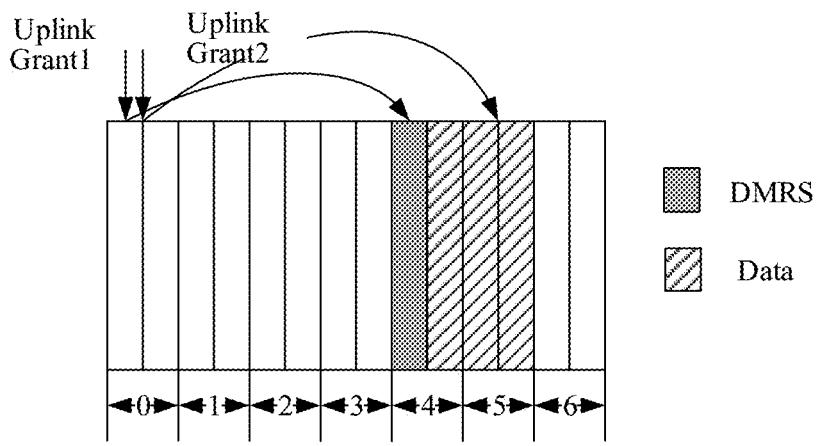
FIG. 4 is a first schematic diagram of a TTI according to an embodiment of the present disclosure.

As shown in FIG. 4, there are a total of 7 TTIs, and it is assumed that each TTI contains two SC-FDMA symbols. In this embodiment, it can be assumed that k=4, that is, the DMRS is sent on TTI#n+4, and the uplink grant 1 on TTI#0 schedules the UE to send data on TTI#4. At this time, m=0, that is, both of the DMRS and the data are sent on TTI#4. The uplink grant 2 on TTI #0 schedules the UE to send data on TTI #5. At this time, m=1, that is, the DMRS is sent on TTI#4, and the data is sent on TTI#5. According to the scheduling grants 1 and 2, the UE learns that the locations of the DMRSs are the same, and the UE sends the DMRS on the TTI #4. The DMRS may be identical for the two times of scheduling. For example, the DMRS has two ports, then the data on TTI#4 and 5 can also use two ports. When there is precoding, the DMRS can use only one type of precoding, and the precoding of the data on the two TTIs is the same as the precoding on the DMRS. That is, the two TTIs completely share the DMRS sent on the TTI #4. Alternatively, the DMRS on TTI#4 and the DMRS on TTI#5 are multiplexed on TTI#4. For example, the DMRS has two ports, assuming p and p+1, where TTI#4 uses the port p, TTI #5 uses the port p+1. That is, the DMRSs of the two TTIs are not shared, but are multiplexed on one symbol.

With the above indication manner, even when the uplink grant 1 is missed from detection, the UE can still obtain the resource location for sending the DMRS and the data according to the uplink grant 2, and the time difference between the resource location for receiving the uplink grant and the resource location for sending the DMRS still satisfies the minimum timing.

Preferably, when the eNB schedules the UE to share the same DMRS in a plurality of TTIs, the information about the DMRS indicated in the DCI may be the same, and the information may include at least one of: cyclic shift of a DMRS sequence, Orthogonal Convolutional Code (OCC), frequency domain location information, etc. Here, the frequency domain location information refers to, when the DMRS only occupies part of the subcarriers, which partial subcarriers are occupied by the UE. For example, the eNB indicates to the UE whether the subcarrier occupied by the UE is an even-numbered subcarrier or an odd-numbered subcarrier. The frequency domain information can also be referred to as comb tooth information.

When a plurality of UEs multiplex (or reuse) the DMRSs on the same symbol, as shown in FIG. 4, the uplink grant 1 may be a scheduling grant for one UE, the uplink grant 2 may be a scheduling grant for another UE. The eNB sends the uplink grant 1 and the uplink grant 2, the DMRSs of the two UEs can be multiplexed onto the same symbol.

Optionally, the location of the DMRS in the TTI may be preset or indicated by the eNB. For example, the location of the DMRS in the TTI may be preset as the first symbol in the TTI, or the eNB may notify the location of the DMRS in the TTI in the DCI.

The above method can also be used for the cases where the divisions of the uplink and downlink TTIs are different, which will be described below.

Figure 5:
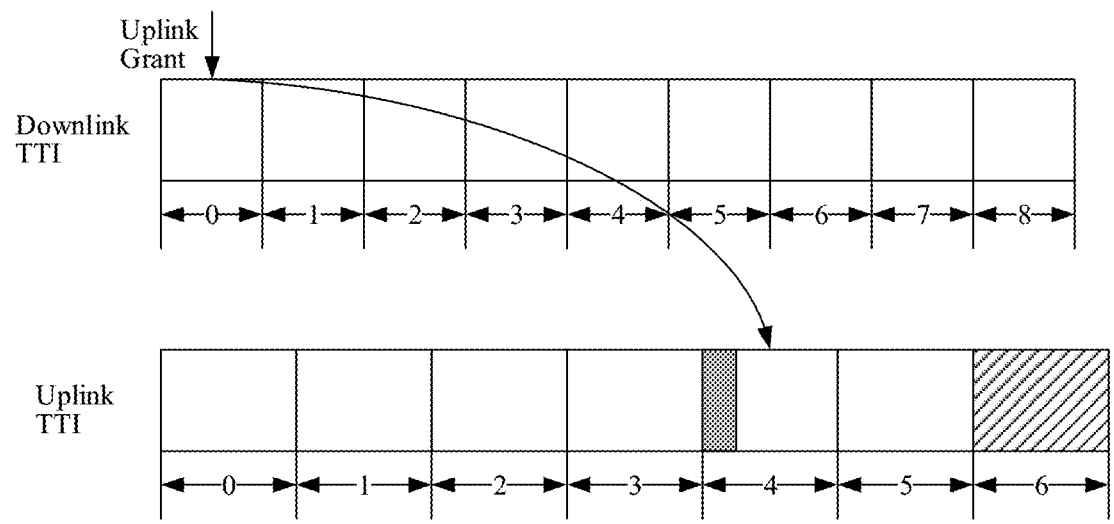
FIG. 5 is a second schematic diagram of a TTI according to an embodiment of the present disclosure.

As shown in FIG. 5, the divisions of the uplink and downlink TTI are different, and the uplink and downlink TTIs are not aligned. In this case, the location for sending the DMRS is determined by a designated time interval. For example, the DMRS is sent on the first TTI after the designated time interval. In FIG. 5, the designated interval is equal to 3 uplink TTIs, and the DMRS is sent on the uplink TTI #4. The location for sending the data is notified by the eNB, similar to the above, such as m=2, indicating that the data is sent on the second TTI after the TTI for sending the DMRS.

Embodiment 2

This embodiment provides a method for transmitting information. The method in this embodiment can be used for uplink or downlink, and can be used for a control channel or a data channel. An example of an uplink data channel and a short TTI system will be described below. It should be noted that the method provided in this embodiment is not limited to the short TTI technology.

In this embodiment, the TTI may be divided in advance. The division of the TTIs is similar to that in the description of Embodiment 1. In this embodiment, a set of candidate time domain locations for the DMRS may be preset or configured. For example, the eNB configures the candidate locations for the DMRS for the UE through the RRC signaling or the SIB as the first symbol, the sixth symbol, and the tenth symbol in one subframe.

Optionally, assuming that the divisions for the uplink and downlink TTIs are the same, assuming that the UE receives the UL grant on TTI#n, the location for the UE to send the DMRS is the first candidate time domain location for the DMRS starting from TTI#n+k (i.e., the first candidate time domain location for the DMRS may be located in TTI#n+k, or may be located in the TTI after TTI#n+k), and the location at which the UE sends data is TTI#n+k+m. In this embodiment, the UE may determine the location for sending the DMRS according to n+k, and determine the location for sending the data according to n+k+m, where k and m are non-negative integers, k is preset or indicated by the eNB. For example, k corresponds to the minimum timing, for example, may be preset as 4, or the eNB notifies the UE of the value of k through SIB or RRC signaling or DCI. m is indicated by DCI. For example, m can have four values, which may be 0, 1, 2, and 3 respectively. When both k and m are indicated by DCI, the two can be jointly encoded, as shown in Table 1.

TABLE 1

| value indicated in DCI | k | m |
|---|---|---|
| 0 | 4 | 0 |
| 1 | 4 | 1 |
| 2 | 4 | 2 |
| 3 | 4 | 3 |
| 4 | 5 | 0 |
| 5 | 5 | 1 |
| 6 | 5 | 2 |
| 7 | 5 | 3 |

Optionally, m may also be a negative number, indicating that the data is before the DMRS.

For example, in FIG. 4, it is assumed that the divisions of the uplink and downlink TTIs are the same. Among the 14 symbols shown in FIG. 4, eNB may configure the set of candidate time domain locations for the DMRS to include the first symbol, the sixth symbol, and the tenth symbol. Then, when TTI#n+k is TTI#4, the candidate time domain location for the DMRS falling in TTI#4 is the 10th symbol, and thus the DMRS will be sent on the 10th symbol.

Figure 6:
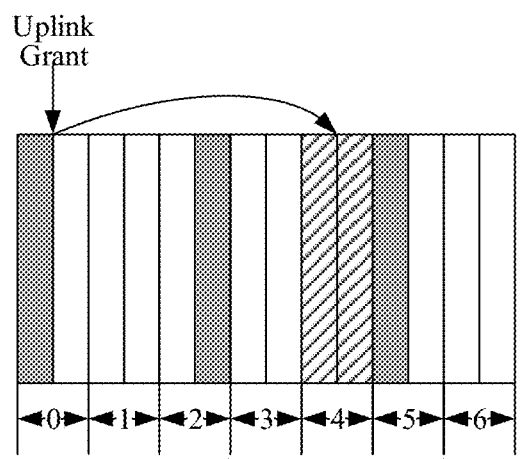
FIG. 6 is a third schematic diagram of a TTI according to an embodiment of the present disclosure.

For another example, in FIG. 6, it is assumed that divisions of the uplink and downlink TTIs are the same. Assuming that k=4, m=0, where the color gray indicates the candidate location for sending the DMRS (i.e., the candidate DMRS time domain location), there are three locations, which are the first symbol, the sixth symbol, and the eleventh symbol respectively. When the UE receives the uplink grant on TTI #0, the DMRS is sent on the third candidate location, i.e. on the eleventh symbol, and the data is sent on TTI#4.

Figure 7:
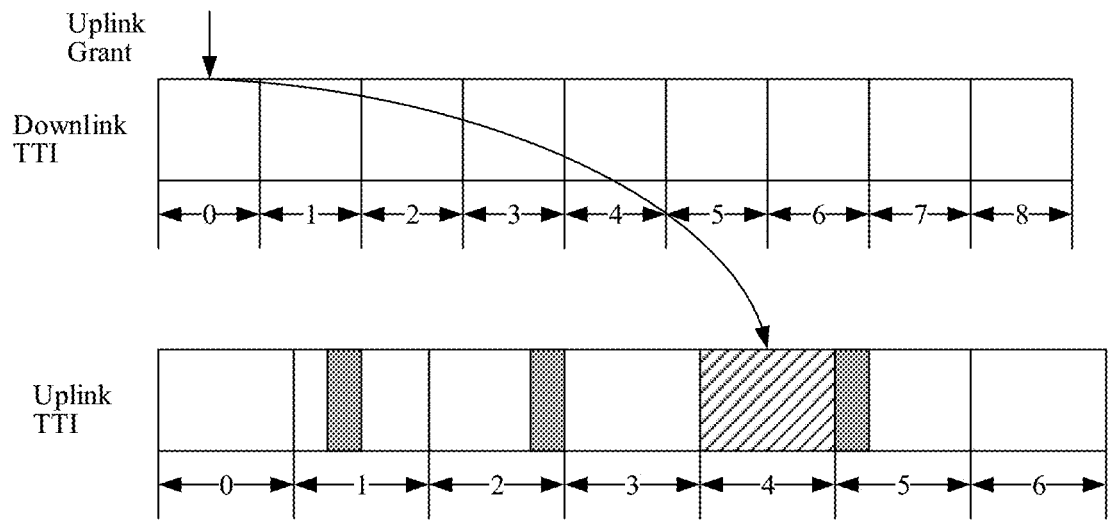
FIG. 7 is a fourth schematic diagram of a TTI according to an embodiment of the present disclosure.

It is assumed that divisions of the uplink and downlink TTIs are different. As shown in FIG. 7, where the color gray indicates the candidate location for sending the DMRS (i.e., the candidate DMRS time domain location), there are a total of three locations, and the sending location of the DMRS may be determined by a designated time interval. For example, the DMRS is sent at the first candidate DMRS time domain location after the designated time interval. Assuming that the designated time interval is 3 uplink TTIs, when the UE receives the uplink grant on TTI #0, the DMRS is sent at the third candidate location, and the data is sent on TTI #4.

Optionally, the divisions of the uplink and downlink TTIs are the same. Assuming that the UE receives the UL grant in TTI#n, the UE sends the DMRS at the first candidate DMRS time domain location after TTI#n+k, and the UE sends data at the TTI where the time domain location for the DMRS is located or the TTI after the TTI where the DMRS is located, for example, indicated by m, m is a non-negative integer, and the value of m may be notified in the DCI. When m=0, it may indicate that the time domain location for sending the data is the same as the TTI where the time domain location for sending the DMRS is located. When m>1, it may indicate that the time domain location for sending the data by the UE is the m-th TTI after the TTI where the time domain location for sending the DMRS is located. For example, in FIG. 6, assuming k=4, m=0, then the DMRS is sent on the third candidate location, that is, on the eleventh symbol, and the data is sent on TTI #5.

When the divisions of the uplink and downlink TTIs are different, it is similar to the above, which will not be repeated herein.

Optionally, in this embodiment and other embodiments, the time domain location for the data may not be an offset of a TTI, but an offset of a symbol. For example, the eNB notifies that the data is sent on the m-th symbol after the DMRS, or the eNB notifies that the data is sent on the m-th symbol after the designated time interval, where m may also be a negative number, which indicates that the data is sent before the DMRS.

Embodiment 3

In this embodiment, a method for transmitting information is provided. The method in this embodiment can be used for uplink or downlink, and can be used for a control channel or a data channel. An example of an uplink data channel and a short TTI system will be described below. It should be noted that the method provided in this embodiment is not limited to the short TTI technology.

The method in this embodiment is similar to the method in the Embodiment 2, except that in this embodiment, the division of the TTIs does not include the DMRS. The candidate time domain location of the DMRS is preset or configured by the eNB. For example, it is the first symbol of each time slot. However, it is not limited to this method in practical application.

Optionally, assuming that the divisions of the uplink and downlink TTIs are the same. If the UE receives the UL grant in the TTI#n, the location for the UE to send the DMRS is the first DMRS after the TTI#n+k, and the location for the UE to send the data is TTI#n+k+m. That is, the UE can determine the location for sending the DMRS according to n+k, and can determine the location for sending the data according to n+k+m, where k and m are non-negative integers, and k is preset or indicated by the eNB. For example, k corresponds to the minimum timing, for example, is preset as 4, or, the value of k is notified by the eNB through SIB or RRC signaling or DCI. m is indicated by DCI. For example, m can have three values, namely 1, 2 and 3, respectively.

Figure 8:
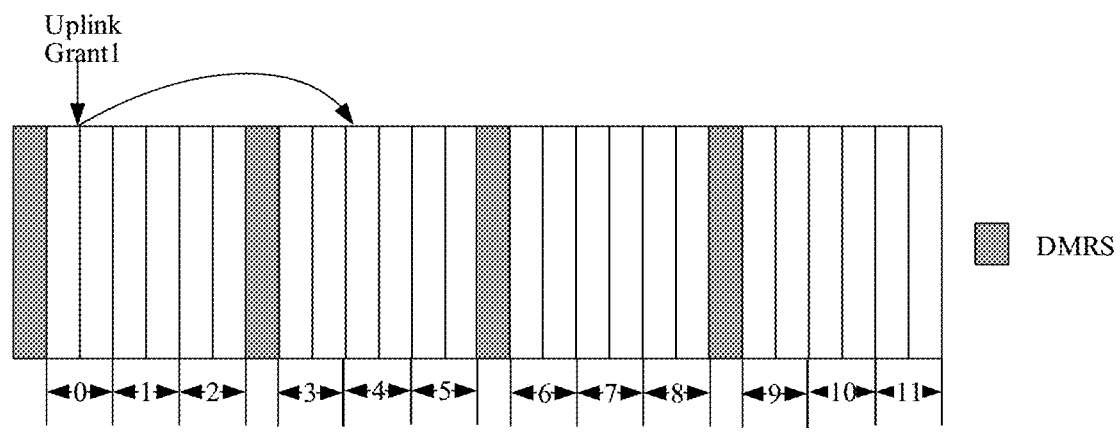
FIG. 8 is a fifth schematic diagram of a TTI according to an embodiment of the present disclosure.

As shown in FIG. 8, there are two subframes in FIG. 8, which are divided into 12 TTIs, and the candidate DMRS time domain location is the first symbol of each slot in each subframe. Assuming k=4, m=0, the color gray indicates the candidate location for sending DMRS. There are 4 locations in FIG. 8. When the UE receives the uplink grant on TTI#0, the DMRS is sent in the third candidate location, and the data is sent on TTI #4.

Optionally, the divisions of the uplink and downlink TTIs are the same. If the UE receives the UL grant in TTI#n, the location for the UE to send the DMRS is the first candidate DMRS time domain location after TTI#n+k, and the location for the UE to send the data is the m-th TTI after the time domain for sending the DMRS, where m is notified by the eNB through the DCI and m is a positive integer.

As shown in FIG. 8, it is assumed that k=4 and m=1. In FIG. 8, the color gray indicates the candidate location for sending the DMRS, and there are a total of four locations. When the UE receives the uplink grant on TTI#0, the DMRS is sent at the third candidate location. The data is sent on the first TTI after the DMRS, that is, on TTI #6.

When the divisions of the uplink and downlink TTI are different, the above method can also be applied. That is, the location of the DMRS is determined by the designated time interval, which is similar to the embodiment 2.

In this embodiment, the transmission of the DMRS can also be classified into one TTI, so that the method in the embodiment 2 can be applied. For example, each DMRS is classified into the immediately first TTI. In this case, the DMRS is included in the TTI.

Embodiment 4

In this embodiment, a method for sending information is provided. The method in this embodiment can be used for uplink or downlink, and can be used for a control channel or a data channel. This embodiment takes an uplink traffic channel and a short TTI system as an example for illustration. It should be noted that the method provided in this embodiment is not limited to the short TTI technology.

Similar to embodiment 1, the subframe in one LTE is divided into several TTIs according to a preset manner. For example, in the related art, one subframe in the LTE system includes 14 OFDM symbols or SC-FDMA symbols. It is assumed that every 2 symbols are divided into one TTI in a chronological order, so 14 symbols can be divided into 7 TTIs. Alternatively, when performing TTI division, the TTIs may also be of unequal lengths. For example, one time slot is divided into three TTIs, and the number of symbols included in a TTI resulted from division in a chronological order may be 3, 2, and 2, respectively. In the embodiment of the present disclosure, the method for dividing the TTI is not limited, and is not limited to the above examples.

Assuming that the UE receives the UL grant at TTI #n, the UE determines whether it is needed to send the DMRS according to the indication of the eNB. If the DMRS is required to be sent, the time domain location for sending the DMRS and the data is determined according to the preset and/or the indication of the eNB. The method for determining the time domain location for sending the DMRS and the data is similar to Embodiment 1, which will not be repeated herein.

Optionally, the eNB may indicate whether the DMRS is required to be sent through DCI. The DCI may include an indication field, and the indication field may indicate whether to send the DMRS with 1 bit. Another indication field may also be included in the DCI for indicating the locations for sending the DMRS and data. As shown in Embodiment 1, the values of m and k may be preset or notified by the eNB through RRC or SIB signaling. Alternatively, both m and k may be indicated by the eNB through DCI. When it is indicated that the DMRS is not required to be sent, the indication field of the locations of the DMRS and the data may be an arbitrary value or a preset value. Optionally, when the UE is instructed not to send the DMRS, the UE may ignore the indication field of the locations of the DMRS and the data.

Optionally, whether to send the DMRS and the locations for sending the DMRS and the data may be jointly encoded. Table 2 gives an example, and the actual application is not limited to the example of Table 2.

TABLE 2

| Indication Value | m | Corresponding transmitting manner |
|---|---|---|
| 0 | / | no DMRS |
| 1 | 0 | there is DMRS, and data and DMRS are on the same sTTI |
| 2 | 1 | there is DMRS, and data is on the first sTTI after the sTTI where the DMRS is located |
| 3 | 2 | there is DMRS, and data is on the second sTTI after the sTTI where the DMRS is located |

Embodiment 5

A method for transmitting information is given in this embodiment. The method in this embodiment can be used for uplink or downlink, and can be used for a control channel or a data channel. This embodiment takes an uplink data channel and a short TTI system as an example for illustration. It should be noted that the method provided in this embodiment is not limited to the short TTI technology Similar to Embodiment 2 described above, the TTIs may be divided in advance. In this embodiment, a set of candidate time domain locations of DMRSs may be preset or configured. Assuming that the UE receives the UL grant at the TTI #n, the UE may determine whether the DMRS is required to be sent according to the indication of the eNB. If it is determined that the DMRS is required to be sent, the UE may determine the time domain locations for sending the DMRS and the data according to the preset and/or the indication of the eNB. The method for determining the time domain locations for sending the DMRS and data is similar to Embodiment 2, which will not be repeated herein.

Optionally, the DCI may include an indication field, where the indication field may indicate whether to send the DMRS with 1 bit. Another indication field may also be included in the DCI for indicating the locations for sending the DMRS and data. As shown in Embodiment 2, the values of m and k may be preset or notified by the eNB through RRC or SIB signaling. Alternatively, both m and k may be indicated by the eNB through DCI. When eNB indicates that the DMRS is not required to be sent, the indication field of the locations of the DMRS and the data may be an arbitrary value or a preset value. Optionally, when the UE is instructed not to send the DMRS, the UE may ignore the indication field of the locations of the DMRS and the data.

Optionally, whether to send the DMRS and the locations for sending the DMRS and the data may be jointly encoded, similar to Table 2 above.

Embodiment 6

In this embodiment, a method for sending information is provided. The method in this embodiment can be used for uplink or downlink, and can be used for a control channel or a data channel. This embodiment takes an uplink traffic channel and a short TTI system as an example for illustration. It should be noted that the method provided in this embodiment is not limited to the short TTI technology.

Similar to embodiment 3, the divisions of the TTI does not include the DMRS. The candidate time domain location of the DMRS is preset or configured by the eNB. Assuming that the UE receives the UL grant at the TTI #n, the UE determines whether the DMRS is required to be sent according to the indication of the eNB. If it is determined that the DMRS is required to be sent, the UE determines the time domain location for sending the DMRS and the data according to the preset and/or the indication of the eNB. The method of determining the time domain location for sending the DMRS and data is similar to embodiment 3, which will not be repeated herein.

Optionally, the eNB may indicate whether the DMRS is required to be sent through DCI. The DCI may include an indication field, and the indication field may indicate whether to send the DMRS with 1 bit. Another indication field may also be included in the DCI for indicating the locations for sending the DMRS and data. As shown in Embodiment 3, the values of m and k may be preset or notified by the eNB through RRC or SIB signaling. Alternatively, both m and k may be indicated by the eNB through DCI. When it is indicated that the DMRS is not required to be sent, the indication field of the locations of the DMRS and the data may be an arbitrary value or a preset value. Optionally, when the UE is instructed not to send the DMRS, the UE may ignore the indication field of the locations of the DMRS and the data.

Optionally, whether to send the DMRS and the locations for sending the DMRS and the data may be jointly encoded, similar to Table 2.

Embodiment 7

This embodiment provides a method for transmitting information. In this embodiment, the DMRS may be sent on a part of the subcarriers in the frequency domain resource allocated on one symbol, that is, the DMRS is sent through comb teeth.

The partial subcarriers or comb teeth sent by the UE may be preset, or configured by the eNB, or jointly obtained by preset and eNB configuration. The comb teeth in this embodiment include a frequency domain density and a frequency domain offset of the comb teeth. For example, in 12 subcarriers, when only the even subcarriers are occupied, the frequency domain density of the comb teeth is ½, and the frequency offset is 0 ("frequency offset" may also be referred to as "frequency domain offset", and the two terms are interchangeable, which will not be repeatedly noted later). When only the odd subcarriers are occupied, the frequency domain density of the comb teeth is ½ and the frequency domain offset is 1.

Figure 9:
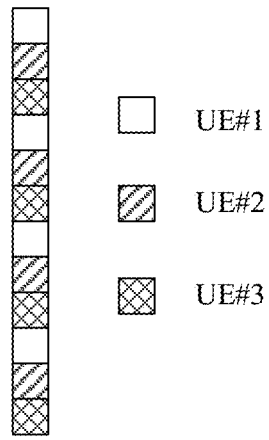
FIG. 9 is a schematic diagram of comb teeth according to an embodiment of the present disclosure.

Optionally, the comb teeth sent by the UE may be obtained according to a Cell Radio Network Temporary Identifier (C-RNTI) of the UE. For example, $Tc=n_{C\text{-}RNTI} \bmod N$ where "mod" indicates a modulo operation, $n_{C\text{-}RNTI}$ indicates the C-RNTI of the UE, N is a preset value, or a value notified by the eNB. The eNB may notify through RRC or SIB signaling or DCI. For example, the preset N value is 3, and the value of Tc is one of 0, 1, and 2. At this time, the DMRS density is ⅓, and the foregoing 0, 1, and 2 respectively represent different comb teeth, as shown in FIG. 9. A small block can represent one RE in LTE, and DMRSs of 3 UEs are multiplexed onto one symbol by occupying different subcarriers. The resources allocated by each UE may be the same or different.

Alternatively, the density of the comb teeth may be preset or notified by the eNB through RRC signaling or SIB or DCI. The frequency domain offset of the comb teeth can be obtained in a preset manner. For example, according to the C-RNTI of the UE, for example, where N is a reciprocal of the density, such as a density of ½, then N=2.

Optionally, for comb teeth, such as the comb teeth occupied by UE#1, the DMRSs of a plurality of UEs may also be accommodated, and the DMRS of these UEs may be coded by using different cyclic shifts.

Optionally, the eNB may notify the UE of the frequency domain density and the frequency domain offset of the comb teeth, or the frequency domain density of the comb teeth is preset, and the frequency domain offset is notified by the eNB, for example, notified by the eNB through the RRC or the SIB signaling or notified through the DCI. The frequency domain density and frequency domain offset of the comb teeth may be respectively notified by the eNB through the DCI, or may be jointly encoded in the DCI. An example of an indication is given in Table 3. The eNB notifies the UE of a value in the configuration index in the DCI to indicate to the UE the frequency domain density and the frequency domain offset of the comb teeth, and the UE can obtain the subcarriers for sending the DMRS. For example, in FIG. 9, the frequency offset of UE#3 is 0, the frequency offset of UE#2 is 1, and the frequency offset of UE#1 is 2.

TABLE 3

| configuration index | density of comb teeth | frequency offset |
|---|---|---|
| 0 | 1 | 0 |
| 1 | ½ | 0 |
| 2 | ½ | 1 |
| 3 | ⅓ | 0 |
| 4 | ⅓ | 1 |
| 5 | ⅓ | 2 |

Alternatively, the "frequency domain location of the DMRS" may also be jointly encoded with "time domain locations of the DMRS and data".

Alternatively, "frequency domain location of the DMRS", "time domain locations of the DMRS and data", and "whether or not to send DMRS" may also be jointly encoded.

Embodiment 8

A method for sending a DMRS is given in this embodiment. In this embodiment, the frequency domain location for the UE to send the DMRS corresponds to the time domain location for sending the data. Alternatively, the frequency domain location for the UE to send the DMRS is determined from the time domain location for sending the data. Alternatively, the time domain location for the UE to send the data is determined from the frequency domain location for the UE to send the DMRS.

Optionally, the frequency domain offset of the DMRS sent by the UE corresponds to the time domain location for sending the data.

For example, the frequency domain density of the DMRS is preset, for example, ⅓, that is, one DMRS for every 3 REs. As shown in FIG. 8, there are three frequency domain offsets, which can be represented by 0, 1, and 2, respectively. Then, taking the method in Embodiment 1 as an example, there may be correspondence relationship in Table 4 or Table 5. The eNB may indicate a configuration index in the table through the DCI, or indicate a frequency domain offset value, or indicate the value of m. The same is true for the methods in Embodiments 2 and 3.

TABLE 4

| configuration index | frequency offset of comb teeth | m | time domain location of data |
|---|---|---|---|
| 0 | 0 | 0 | data and DMRS are on the same TTI |
| 1 | 1 | 1 | data is on the first TTI after the TTI where the DMRS is located |
| 2 | 2 | 2 | data is on the second TTI after the TTI where the DMRS is located | or

TABLE 5

| configuration index | frequency offset of comb teeth | m | time domain location of data |
|---|---|---|---|
| 0 | 0 | 0 | data is on the first TTI after the designated time interval |
| 1 | 1 | 1 | data is on the second TTI after the designated time interval |
| 2 | 2 | 2 | data is on the third TTI after the designated time interval |

Taking the method in Embodiment 4 as an example, there may be a correspondence relationship in Table 6 or Table 7. The eNB may indicate the configuration index in the table through the DCI. The same is true for the methods in Embodiments 5 and 6.

TABLE 6

| Index | comb teeth | time domain location of data |
|---|---|---|
| 0 | / | no DMRS |
| 1 | 0 | data and DMRS are on the same TTI |
| 2 | 1 | data is on the first TTI after the TTI where the DMRS is located |
| 3 | 2 | data is on the second TTI after the TTI where the DMRS is located |

TABLE 7

| Index | comb teeth | time domain location of data |
|---|---|---|
| 0 | / | no DMRS |
| 1 | 0 | data is on the first TTI after the designated time interval |
| 2 | 1 | data is on the second TTI after the designated time interval |
| 3 | 2 | data is on the third TTI after the designated time interval |

If the frequency domain density and the frequency domain offset of the DMRS are all indicated by the eNB through the DCI, the embodiment 1 is taken as an example, and the indication manners are given in Tables 8 and 9. In practical applications, the frequency domain density of the DMRS may include ¼, ⅕, etc., and is not limited in the embodiment of the present disclosure. The eNB may indicate the configuration index in the table through the DCI. The same is true for the methods in Embodiments 2 and 3.

TABLE 8

| configuration index | frequency domain density of DMRS | frequency domain offset of DMRS | m | time domain location of data |
|---|---|---|---|---|
| 0 | 1 | / | 0 | data and DMRS are on the same TTI |
| 1 | ½ | 0 | 0 | data and DMRS are on the same TTI |
| 2 | ½ | 1 | 1 | data is on the first TTI after the TTI where the DMRS is located |
| 3 | ⅓ | 0 | 0 | data and DMRS are on the same TTI |
| 4 | ⅓ | 1 | 1 | data is on the second TTI after the TTI where the DMRS is located |
| 5 | ⅓ | 2 | 2 | data is on the third TTI after the TTI where the DMRS is located |

TABLE 9

| configuration index | frequency domain density of DMRS | frequency domain offset of DMRS | m | time domain location of data |
|---|---|---|---|---|
| 0 | 1 | / | 0 | data and DMRS are on the same TTI |
| 1 | 1 | / | 1 | data is on the first TTI after the TTI where the DMRS is located |
| 2 | 1 | / | 2 | data is on the second TTI after the TTI where the DMRS is located |
| 3 | ½ | 0 | 0 | data and DMRS are on the same TTI |
| 4 | ½ | 1 | 1 | data is on the first TTI after the TTI where the DMRS is located |
| 5 | ⅓ | 0 | 0 | data and DMRS are on the same TTI |
| 6 | ⅓ | 1 | 1 | data is on the first TTI after the TTI where the DMRS is located |
| 7 | ⅓ | 2 | 2 | data is on the second TTI after the TTI where the DMRS is located |

Taking Embodiment 4 as an example, an example of an indication manner is given in Table 10. In practical application, the frequency domain density of the DMRS may include ¼, ⅕, etc., and is not limited in the embodiment of the present disclosure. The eNB may indicate the configuration index in the table through the DCI. The same is true for the methods in Embodiments 5 and 6.

TABLE 10

| configuration index | frequency domain density of DMRS | frequency domain offset of DMRS | m | time domain location of data |
|---|---|---|---|---|
| 0 | / | / | / | no DMRS |
| 1 | 1 | / | 0 | data and DMRS are on the same TTI |
| 2 | ½ | 0 | 0 | data and DMRS are on the same TTI |
| 3 | ½ | 1 | 1 | data is on the first TTI after the TTI where the DMRS is located |
| 4 | ⅓ | 0 | 0 | data and DMRS are on the same TTI |
| 5 | ⅓ | 1 | 1 | data is on the first TTI after the TTI where the DMRS is located |
| 6 | ⅓ | 2 | 2 | data is on the second TTI after the TTI where the DMRS is located |

Embodiment 9

A method of sending a DMRS is given in this embodiment. In this embodiment, the cyclic shift of the DMRS sequence sent by the UE corresponds to the time domain location of the information data. Alternatively, the time domain location of the data sent by the UE is determined by the cyclic shift information of the DMRS sequence sent by the UE.

In the related art, $n_{cs,\lambda}=(n_{DMRS}^{(1)}+n_{DMRS,\lambda}^{(2)}+n_{PN}(n_s))$ mod 12, where $n_{DMRS,\lambda}^{(2)}$ is a cyclic shift information, which is indicated in the DCI.

Taking the method in Embodiment 1 as an example, an example of an indication manner is given in Table 11. The methods in other embodiments are also similar.

TABLE 11

| configuration index | $n_{DMRS,\lambda}^{(2)}$ $\lambda = 0$ | $\lambda = 1$ | $\lambda = 2$ | $\lambda = 3$ | time domain location of data |
|---|---|---|---|---|---|
| 000 | 0 | 6 | 3 | 9 | data and DMRS are on the same TTI |

TABLE 11-continued

| configuration index | $n_{DMRS,\lambda}^{(2)}$ | | | | time domain location of data |
|---|---|---|---|---|---|
| | $\lambda = 0$ | $\lambda = 1$ | $\lambda = 2$ | $\lambda = 3$ | |
| 001 | 6 | 0 | 9 | 3 | data and DMRS are on the same TTI |
| 010 | 3 | 9 | 6 | 0 | data is on the first TTI after the TTI where the DMRS is located |
| 011 | 4 | 10 | 7 | 1 | data is on the first TTI after the TTI where the DMRS is located |
| 100 | 2 | 8 | 5 | 11 | data is on the first TTI after the TTI where the DMRS is located |
| 101 | 8 | 2 | 11 | 5 | data is on the second TTI after the TTI where the DMRS is located |
| 110 | 10 | 4 | 1 | 7 | data is on the second TTI after the TTI where the DMRS is located |
| 111 | 9 | 3 | 0 | 6 | data is on the second TTI after the TTI where the DMRS is located |

If the UE receives configuration index "010", it is indicated that $n_{DMRS,\lambda}^{(2)}$ in the cyclic shift of the DMRS of the UE is 3, and the data is on the first TTI after the TTI where the DMRS is located.

Embodiment 10

The cyclic shift information of the DMRS sent by the UE, the time domain location of the data, and the frequency domain offset of the DMRS are corresponding to one another. Alternatively, the time domain location of the data is determined by the cyclic shift information of the DMRS and the frequency domain offset of the DMRS. Alternatively, the frequency domain offset of the DMRS is determined by the cyclic shift information of the DMRS and the time domain location of the data. As shown in Table 12:

TABLE 12

| configuration index | $n_{DMRS,\lambda}^{(2)}$ | | | | time domain location of data | frequency domain offset of DMRS |
|---|---|---|---|---|---|---|
| | $\lambda = 0$ | $\lambda = 1$ | $\lambda = 2$ | $\lambda = 3$ | | |
| 000 | 0 | 6 | 3 | 9 | data and DMRS are on the same TTI | 0 |
| 001 | 6 | 0 | 9 | 3 | data and DMRS are on the same TTI | 0 |
| 010 | 3 | 9 | 6 | 0 | data is on the first TTI after the TTI where the DMRS is located | 1 |
| 011 | 4 | 10 | 7 | 1 | data is on the first TTI after the TTI where the DMRS is located | 1 |
| 100 | 2 | 8 | 5 | 11 | data is on the first TTI after the TTI where the DMRS is located | 1 |
| 101 | 8 | 2 | 11 | 5 | data is on the second TTI after the TTI where the DMRS is located | 2 |
| 110 | 10 | 4 | 1 | 7 | data is on the second TTI after the TTI where the DMRS is located | 2 |
| 111 | 9 | 3 | 0 | 6 | data is on the second TTI after the TTI where the DMRS is located | 2 |

Through the description of the above embodiments, those skilled in the art can clearly understand that the method according to the above embodiment can be implemented by means of software in combination with a necessary general hardware platform, and of course, by hardware. However, in many cases, the former is a better implementation. Based on such understanding, the technical solution of the present disclosure, in its essential or as a part contributing to the related art, may be embodied in the form of a software product stored in a storage medium (such as ROM/RAM, a magnetic disk, an optical disc), including a number of instructions for causing a terminal device (which may be a mobile phone, a computer, a server, or a network device, etc.) to perform the method of various embodiments of the present disclosure.

In an embodiment, an apparatus for transmitting a physical uplink shared channel (PUSCH) and an apparatus for receiving a physical uplink shared channel (PUSCH) are provided. The apparatuses are configured to implement the above embodiments and preferred embodiments, and details will not be repeated herein. As used below, the term "module" may be a combination of software and/or hardware implementing a predetermined function. Although the apparatuses described in the following embodiments are preferably implemented in software, hardware or a combination of software and hardware is also possible and contemplated.

Figure 10:
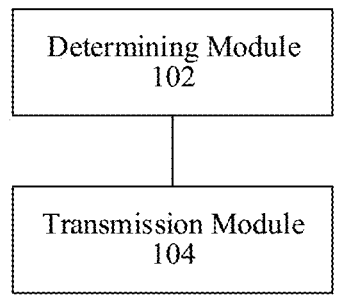
FIG. 10 is a block diagram of an apparatus for transmitting a PUSCH according to an embodiment of the present disclosure.

FIG. 10 is a block diagram of an apparatus for transmitting a PUSCH according to an embodiment of the present disclosure. As shown in FIG. 10, the apparatus includes a determining module 102 and a transmission module 104, which are described below.

The determining module 102 is configured to determine a time domain location for transmitting the PUSCH according to a downlink transmission time interval TTI for receiving a scheduling grant. The transmission module 104 is connected to the determining module 102, and configured to transmit the PUSCH in the determined time domain location. The scheduling grant includes at least one of the following information: indication information for indicating whether to transmit a demodulation reference signal DMRS; first time domain location related information for transmitting the demodulation reference signal DMRS; second time domain location related information for transmitting data; information on frequency domain density of the demodulation reference signal DMRS; and frequency domain offset information of the demodulation reference signal DMRS.

In an optional embodiment, when the second time domain location related information indicates an offset of a time domain location for transmitting the data from a time domain location for transmitting the DMRS, the determining module 102 includes: a first determining unit configured to determine the time domain location for transmitting the DMRS according to the downlink TTI and a designated time interval; and determine the time domain for transmitting the data according to the time domain for transmitting the DMRS and the second time domain location related information.

In an optional embodiment, the determining module 102 includes: a second determining unit configured to determine a time domain location for transmitting the DMRS according to the downlink TTI and the designated time interval; and determine a time domain location for transmitting data according to the designated time interval and the second time domain location related information. The second time domain location related information indicates one of: an offset of a time domain location for transmitting the data from a first designated uplink TTI, and the first designated uplink TTI is the first uplink TTI after the downlink TTI and having a time interval from the downlink TTI larger than or equal to the designated time interval; the second time domain location related information indicates that the time domain location for transmitting the data is the x-th uplink TTI after a first designated time domain location, and the first designated time domain location is a time domain location after the downlink TTI and offsetting from the downlink TTI by the designated time interval, and x is an integer; and the time domain location for transmitting the data is the x1-th symbol after the first designated time domain location, where the first designated time domain location is a time domain location after the downlink TTI and offsetting from the downlink TTI by the designated time interval, and x1 is an integer.

In an optional embodiment, the second time domain location related information may satisfy a preset first correspondence relationship with at least one of the following information: frequency domain offset information of the DMRS; and cyclic shift information of the DMRS. In this embodiment, the second time domain location related information may not be included in the scheduling grant. In this case, the second time domain location related information has to be determined by other means, for example, determined from the frequency domain offset information of the DMRS and/or the cyclic shift information of the DMRS. The frequency domain offset information of the DMRS and/or the cyclic shift information of the DMRS may be included in the scheduling grant to be notified to the terminal, or may be predetermined. It should be noted that, the second time domain location related information may be carried in the scheduling grant, or determined from the frequency domain offset information of the DMRS and/or the cyclic shift information of the DMRS, and in addition to those, the second time domain location related information may also be predetermined and designated, or may be notified to the terminal by the base station through other signaling, including but not limited to at least one of DCI, RRC, and SIB.

In an optional embodiment, when the frequency domain offset information of the DMRS is not included in the scheduling grant, the frequency domain offset information of the DMRS and/or the cyclic shift information of the DMRS may be notified by the base station through at least one of the following signaling: Downlink Control Information DCI (may be the scheduling grant, or may be other DCI signaling), Radio Resource Control RRC and a System Information Block SIB.

In an optional embodiment, the frequency domain offset information of the DMRS and the cyclic shift information of the DMRS may be notified by the base station through the scheduling grant, or the cyclic shift information of the DMRS may be notified by the base station through the scheduling grant.

In an optional embodiment, the frequency domain offset information of the DMRS and at least one of the following information satisfies a preset second correspondence: second time domain location related information for transmitting data; and the cyclic shift information of the DMRS. Similarly, in this embodiment, the frequency domain offset information of the DMRS may not be included in the scheduling grant. In this case, the frequency domain offset information of the DMRS may be determined by other means. For example, the frequency domain offset information of the DMRS may be determined from the second time domain location related information and/or the cyclic shift information of the DMRS, where the second time domain location related information and/or the cyclic shift information of the DMRS may be included in the scheduling grant to be notified to the terminal, or may be predetermined. It should be noted that the frequency domain offset information of the DMRS may also be predetermined or designated, or may be notified to the terminal by the base station through other signaling, including but not limited to, at least one of DCI, RRC, and SIB.

In an optional embodiment, when the scheduling grant does not include second time domain location related information for transmitting the data, the second time domain location related information for transmitting data and/or the cyclic shift information of the DMRS may be notified by the base station through at least one the following signaling: Downlink Control Information DCI (may be the scheduling grant, or may be other DCI signaling), Radio Resource Control RRC and a System Information Block SIB.

In an optional embodiment, the second time domain location related information for transmitting data and the cyclic shift information of the DMRS may be notified by the base station through the scheduling grant, or the cyclic shift information of the DMRS may be notified by the base station through the scheduling grant. That is, the information on the time domain location and the cyclic shift information of the DMRS, or the cyclic shift information of the DMRS may be carried in the scheduling grant to be notified to the terminal.

In an optional embodiment, the determining module 102 may determine a time domain location for transmitting the DMRS by one of the following manners.

In a first manner, the time domain location for transmitting the DMRS may be determined as the y-th candidate DMRS time domain location starting from a second designated uplink TTI, where y is a positive integer, y is indicated by the first time domain location related information or preset, and the second designated uplink TTI is the first uplink TTI after the downlink TTI and having a time interval from the downlink TTI larger than or equal to the designated time interval.

In a second manner, the time domain location for transmitting the DMRS may be determined as the y-th candidate DMRS time domain location after a second designated time domain location, where y is a positive integer, y is indicated by the first time domain location related information or preset, and the second designated time domain location is the first uplink TTI after the downlink TTI and offsetting from the downlink TTI by the designated time interval.

In an optional embodiment, the candidate DMRS time domain location is preset or configured by a base station.

In an optional embodiment, the candidate DMRS time domain location includes one of: a preset symbol in each TTI; a preset symbol in the designated TTI; and a preset symbol in each subframe. Optionally, the preset symbol in each TTI may be the first symbol in each TTI. Optionally, the preset symbol in the designated TTI may be the first symbol in the designated TTI.

In an optional embodiment, the designated time interval may be preset or notified by the base station. It should be noted that the above two manners for determining the designated time interval are only two preferred manners, and the designated time interval may be negotiated between the base station and the terminal or manually configured, which will not repeated herein.

In an optional embodiment, the designated time interval may include N1 uplink TTIs, or may include N2 downlink TTIs, or may include N3 symbols, where N1 is an integer, N2 is an integer, and N3 is an integer. In this embodiment, the value of N1 may be indicated by the base station or preset, the value of N2 may be indicated by the base station or preset, and the value of N3 may be indicated by the base station or preset.

In an optional embodiment, the transmission module 104 may be specifically configured to, when the time domain location for transmitting the DMRS and the time domain location for transmitting the data are on the same TTI, use all available symbols other than the symbol for transmitting the DMRS on the same TTI for transmitting the data; and when the time domain location for transmitting the DMRS and the time domain location for transmitting the data are not on the same TTI, use all available symbols on the TTI for transmitting the data for transmitting the data.

In an optional embodiment, on the TTI for transmitting the data, when there is a symbol for transmitting the sounding reference signal SRS, the available symbols may include symbols other than the symbol for transmitting the SRS. That is, the available symbols do not include the symbol for transmitting the SRS.

In an optional embodiment, the determining module 102 is specifically configured to: transmit the DMRS on an uplink TTI with an index n+k, and transmit the data on an uplink TTI with an index n+k+m, where n is an index of the downlink TTI, k is a non-negative integer, and m is an integer. In this embodiment, there is a fixed correspondence relationship between the TTI for receiving the scheduling grant and the TTI for transmitting the DMRS and the TTI for transmitting the data, so that the PUSCH transmission can be performed according to the fixed correspondence relationship.

In an optional embodiment, the frequency domain offset information of the DMRS may be a function of a cell radio network temporary identifier C-RNTI of the UE.

In an optional embodiment, when the scheduling grant includes at least two of the following information, the at least two of the following information may be indicated by jointly encoding: information for indicating whether to transmit a DMRS; first time domain location related information for transmitting the DMRS; second time domain location related information for transmitting data; information on frequency domain density of the DMRS; and frequency domain offset information of the DMRS.

Figure 11:
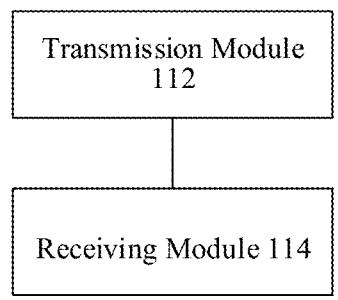
FIG. 11 is a block diagram of an apparatus for receiving a PUSCH according to an embodiment of the present disclosure.

FIG. 11 is a block diagram of an apparatus for receiving a PUSCH according to an embodiment of the present disclosure. As shown in FIG. 11, the apparatus includes a transmission module 112 and a receiving module 114, which are described below.

The transmission module 112 is configured to send a scheduling grant to the user equipment UE. The scheduling grant is used by the UE to determine a time domain location for transmitting the PUSCH, the scheduling grant includes at least one of the following information: indication information indicating whether to transmit a demodulation reference signal DMRS; first time domain location related information for transmitting the demodulation reference signal DMRS; second time domain location related information for transmitting data; information on frequency domain density of the demodulation reference signal DMRS; and frequency domain offset information of the demodulation reference signal DMRS. The receiving module 114 is connected to the transmitting module 112 and configured to receive a PUSCH transmitted by the UE on a determined time domain location for transmitting the PUS CH.

In an optional embodiment, when the second time domain location related information indicates an offset of a time domain location for transmitting the data from a time domain location for transmitting the demodulation reference signal DMRS, the receiving module 114 includes a first receiving unit configured to receive the DMRS transmitted by the UE on a time domain location for transmitting the DMRS, wherein the time domain location for transmitting the DMRS is determined by the UE according to the downlink Transmission Time Interval TTI for receiving the scheduling grant and the designating time interval; and receive the data transmitted by the UE on a time domain location for transmitting the data, wherein the time domain location for transmitting the data is determined by the UE according to the time domain location for transmitting the DMRS and the second time domain location related information.

Optionally, the receiving module 114 includes: a second receiving unit configured to receive a DMRS transmitted by the UE on a time domain location for transmitting the DMRS, wherein the time domain location for transmitting the DMRS is determined by the UE according to the downlink Transmission Time Interval TTI for receiving the scheduling grant and the designated time interval; and receive the data transmitted by the UE on a time domain location for transmitting the data, wherein the time domain location for transmitting the data is determined by the UE according to the designated time interval and the second time domain location related information. The second time domain location related information indicates one of: an offset of a time domain location of the data from a first designated uplink TTI, and the first designated uplink TTI is the first uplink TTI after the downlink TTI and having a time interval from the downlink TTI larger than or equal to the designated time interval; the second time domain location related information indicates that the time domain location for transmitting the data is the x-th uplink TTI after a first designated time domain location, and the first designated time domain location is a time domain location after the downlink TTI and offsetting from the downlink TTI by the designated time interval, and x is an integer; and the time domain location for transmitting the data is the x1-th symbol after the first designated time domain location, where the first designated time domain location is a time domain location after the downlink TTI and offsetting from the downlink TTI by the designated time interval, and x1 is an integer.

It should be noted that each of the above modules may be implemented by software or hardware. For the latter, it may be implemented by, but not limited to that, the modules are all located in the same processor; or, the above modules are located in different processors in any combination.

An embodiment of the present disclosure also provides a storage medium. Optionally, in the present embodiment, the storage medium may be configured to store program codes for executing the steps shown in FIG. 2, or program codes for executing the steps shown in FIG. 3.

Optionally, in the embodiment, the storage medium may include, but is not limited to, a USB flash drive, a Read-Only Memory (ROM), and a Random Access Memory (RAM), a hard disk, a magnetic disk, an optical disk, or a variety of media that can store program codes.

Optionally, in the embodiment, the processor performs the steps shown in FIG. 2 according to the stored program codes in the storage medium.

Optionally, in the embodiment, the processor performs the steps shown in FIG. 3 according to the stored program codes in the storage medium.

For example, the specific examples in this embodiment may refer to the examples described in the above embodiments and the optional embodiments, and details are not described herein again.

It will be apparent to those skilled in the art that the various modules or steps of the present disclosure described above can be implemented by a general-purpose computing apparatus that can be centralized on a single computing apparatus or distributed across a network of a plurality of computing apparatuses. Alternatively, they may be implemented by program codes executable by the computing apparatus such that they may be stored in the storage apparatus and executed by the computing apparatus, and in some cases, to implement the illustrated or described steps in an order different from the order herein. Or, they may be separately fabricated into individual integrated circuit modules, or a plurality of modules or steps thereof may be fabricated as a single integrated circuit module. Thus, the present disclosure is not limited to any specific combination of hardware and software.

The above description is only the exemplary embodiments of the present disclosure, and is not intended to limit the present disclosure. Various modifications and changes can be made to the present disclosure. Any modifications, equivalent substitutions, improvements, etc. made within the spirit and scope of the present disclosure are intended to be included within the scope of the present disclosure.

INDUSTRIAL APPLICABILITY

As described above, the method and the apparatus for transmitting a physical uplink shared channel (PUSCH) disclosed in the embodiments of the present disclosure have the following beneficial effects. The present disclosure can solve the problem in the related art that the resource for transmitting the PUSCH cannot be effectively determined, and can thus achieve the effect of effectively determining the resources for transmitting the PUSCH.

What is claimed is:

1. A method for transmitting a physical uplink shared channel (PUSCH), comprising:
   determining a time domain location for transmitting the PUSCH according to a downlink transmission time interval (TTI) for receiving a scheduling grant; and transmitting the PUSCH in the determined time domain location for transmitting the PUSCH;
   wherein the scheduling grant comprises at least one of: indication information for indicating whether to transmit a demodulation reference signal (DMRS); first time domain location related information for transmitting the DMRS; second time domain location related information for transmitting data; information on frequency domain density of the DMRS; and frequency domain offset information of the DMRS; wherein
   when the second time domain location related information indicates an offset of a time domain location for transmitting the data from a time domain location for transmitting the DMRS, determining the time domain location for transmitting the PUSCH according to the downlink TTI comprises: determining the time domain location for transmitting the DMRS according to the downlink TTI and a designated timing interval; and determining the time domain for transmitting the data according to the time domain for transmitting the DMRS and the second time domain location related information; or
   determining the time domain location for transmitting the PUSCH according to the downlink TTI comprises: determining a time domain location for transmitting the DMRS according to the downlink TTI and a designated timing interval; and determining a time domain location for transmitting the data according to the designated timing interval and the second time domain location related information; wherein the second time domain location related information indicates one of: an offset of the time domain location for transmitting the data from a first designated uplink TTI, where the first designated uplink TTI is a first uplink TTI after the downlink TTI and having a time interval from the downlink TTI larger than or equal to the designated timing interval; the time domain location for transmitting the data is an x-th uplink TTI after a first designated time domain location, where the first designated time domain location is a time domain location after the downlink TTI and offsetting from the downlink TTI by the designated timing interval, and x is an integer; or the time domain location for transmitting the data is an x1-th symbol after a first designated time domain location, where the first designated time domain location is a time domain location after the downlink TTI and offsetting from the downlink TTI by the designated timing interval, and x1 is an integer.

2. The method according to claim 1, wherein the second time domain location related information and at least one of the following information satisfy a preset first correspondence relationship:
   frequency domain offset information of the DMRS; and cyclic shift information of the DMRS.

3. The method according to claim 2, wherein when the frequency domain offset information of the DMRS is not comprised in the scheduling grant, frequency domain offset information of the DMRS and/or cyclic shift information of the DMRS is notified by a base station through at least one of the following signaling: downlink control information DCI, radio resource control RRC, and a system information block SIB.

4. The method according to claim 3, wherein the frequency domain offset information of the DMRS and the cyclic shift information of the DMRS are notified by the base station through the scheduling grant, or the cyclic shift information of the DMRS is notified by the base station through the scheduling grant.

5. The method according to claim 1, wherein the frequency domain offset information of the DMRS and at least one of the following information satisfy a preset second correspondence relationship:

the second time domain location related information; and
the cyclic shift information of the DMRS.

6. The method according to claim 5, wherein when the scheduling grant does not comprise the second time domain location related information, the second time domain location related information and/or the cyclic shift information of the DMRS is notified by the base station through at least one of the following signaling: downlink control information DCI, radio resource control RRC, and a system information Block SIB.

7. The method according to claim 6, wherein the second time domain location related information and the cyclic shift information of the DMRS are notified by the base station through the scheduling grant, or the cyclic shift information of the DMRS is notified by the base station through the scheduling grant.

8. The method according to claim 1, wherein determining the time domain location for transmitting the DMRS according to the downlink TTI and the designated timing interval comprises one of:

determining the time domain location for transmitting the DMRS as a y-th candidate DMRS time domain location starting from a second designated uplink TTI, where y is a positive integer, y is indicated by the first time domain location related information or y is preset, and the second designated uplink TTI is a first uplink TTI after the downlink TTI and having a time interval from the downlink TTI larger than or equal to the designated timing interval; and determining the time domain location for transmitting the DMRS as the y-th candidate DMRS time domain location after a second designated time domain location, where y is a positive integer, y is indicated by the first time domain location related information or y is preset, and the second designated time domain location is a time domain location after the downlink TTI and offsetting from the downlink TTI by the designated timing interval.

9. The method according to claim 8, wherein the candidate DMRS time domain location is preset or configured by a base station.

10. The method according to claim 8, wherein the candidate DMRS time domain location comprises one of the following:

a preset symbol in each TTI;
a preset symbol in a designated TTI; and
a preset symbol in each sub-frame;
wherein the preset symbol in each TTI is the first symbol in each TTI; and/or,
the preset symbol in the designated TTI is the first symbol in the designated TTI.

11. The method according to claim 1, wherein the designated timing interval is preset or notified by the base station eNB.

12. The method according to claim 1, wherein the designated timing interval comprises N1 uplink TTIs, or comprises N2 downlink TTIs, or comprises N3 symbols, where N1 is an integer, N2 is an integer, and N3 is an integer.

13. The method according to claim 1, comprising:

when the time domain location for transmitting the DMRS and the time domain location for transmitting the data are on the same TTI, transmitting the data using all available symbols on the same TTI other than the symbol for transmitting the DMRS; and when the time domain location for transmitting the DMRS and the time domain location for transmitting the data are not on the same TTI, transmitting the data using all available symbols on the TTI for transmitting the data.

14. The method according to claim 1, wherein determining the time domain location for transmitting the PUSCH according to the downlink TTI comprises:

transmitting the DMRS on an uplink TTI with an index n+k, and transmitting the data on an uplink TTI with an index n+k+m, where n is an index of the downlink TTI, k is a non-negative integer, and m is an integer.

15. The method according to claim 1, wherein the frequency domain offset information of the DMRS is a function of a cell radio network temporary identifier C-RNTI of user equipment (UE).

16. The method according to claim 1, wherein when the scheduling grant comprises at least two of the following information, the at least two of the following information is indicated by means of jointly encoding:

information for indicating whether to transmit a DMRS; the first time domain location related information; second time domain location related information; information on frequency domain density of the DMRS; and frequency domain offset information of the DMRS.

17. A method for receiving a physical uplink shared channel (PUSCH), comprising:

sending a scheduling grant to user equipment (UE), wherein the scheduling grant is used by the UE to determine a time domain location for transmitting the PUSCH, the scheduling grant comprises at least one of the following information: indication information indicating whether to transmit a demodulation reference signal (DMRS); first time domain location related information for transmitting the DMRS; second time domain location related information for transmitting data; information on frequency domain density of the DMRS; and frequency domain offset information of the DMRS; and receiving a PUSCH transmitted by the UE on the determined time domain location for transmitting the PUSCH; wherein when the second time domain location related information indicates an offset of a time domain location for transmitting the data from a time domain location for transmitting the DMRS, receiving the PUSCH transmitted by the UE on the determined time domain location for transmitting the PUSCH comprises: receiving the DMRS transmitted by the UE on the time domain location for transmitting the DMRS, wherein the time domain location for transmitting the DMRS is determined by the UE according to a downlink Transmission Time Interval (TTI) for receiving the scheduling grant and a designated timing interval; and receiving the data transmitted by the UE on the time domain location for transmitting the data, wherein the time domain location for transmitting the data is determined by the UE according to the time domain location for transmitting the DMRS and the second time domain location related information; or receiving the PUSCH transmitted by the UE on the determined time domain location for transmitting the PUSCH comprises: receiving the DMRS transmitted by the UE on the time domain location for transmitting the DMRS, wherein the time domain location for transmitting the DMRS is determined by the UE according to a downlink TTI for receiving the scheduling grant and a designated timing interval; and receiving the data transmitted by the UE on the time domain location for transmitting the data, wherein the time domain location for transmitting the data is determined by the UE according to the designated timing interval and the second time domain location related information; wherein the second time domain location related information indicates one of: an offset of the time domain location for transmitting the data from a first designated uplink TTI, where the first designated uplink TTI is a first uplink TTI after the downlink TTI and having a time interval from the downlink TTI larger than or equal to the designated timing interval; the second time domain location related information indicates that the time domain location for transmitting the data is an x-th uplink TTI after a first designated time domain location, where the first designated time domain location is a time domain location after the downlink TTI and offsetting from the downlink TTI by the designated timing interval, and x is an integer; or the time domain location for transmitting the data is an x1-th symbol after a first designated time domain location, where the first designated time domain location is a time domain location after the downlink TTI and offsetting from the downlink TTI by the designated timing interval, and x1 is an integer.

18. An apparatus for transmitting a physical uplink shared channel (PUSCH), comprising: a memory, a processor, and a computer program stored on the memory and operative on the processor, the processor executing the computer program to:

determine a time domain location for transmitting the PUSCH according to a downlink transmission time interval (TTI) for receiving a scheduling grant; and transmit the PUSCH in the determined time domain location for transmitting the PUSCH;

wherein the scheduling grant comprises at least one of the following information: indication information for indicating whether to transmit a demodulation reference signal (DMRS); first time domain location related information for transmitting the DMRS; second time domain location related information for transmitting data; information on frequency domain density of the DMRS; and frequency domain offset information of the DMRS;

wherein the processor executes the computer program to:

when the second time domain location related information indicates an offset of a time domain location for transmitting the data from a time domain location for transmitting the DMRS, determine the time domain location for transmitting the DMRS according to the downlink TTI and a designated timing interval, and determine the time domain for transmitting the data according to the time domain for transmitting the DMRS and the second time domain location related information; or determine a time domain location for transmitting the DMRS according to the downlink TTI and a designated timing interval, and determine a time domain location for transmitting the data according to the designated timing interval and the second time domain location related information; wherein the second time domain location related information indicates one of: an offset of the time domain location for transmitting the data from a first designated uplink TTI, where the first designated uplink TTI is a first uplink TTI after the downlink TTI and having a time interval from the downlink TTI larger than or equal to the designated timing interval; the time domain location for transmitting the data is an x-th uplink TTI after a first designated time domain location, where the first designated time domain location is a time domain location after the downlink TTI and offsetting from the downlink TTI by the designated timing interval, and x is an integer; or the time domain location for transmitting the data is an x1-th symbol after a first designated time domain location, where the first designated time domain location is a time domain location after the downlink TTI and offsetting from the downlink TTI by the designated timing interval, and x1 is an integer.

* * * * *

UNITED STATES PATENT AND TRADEMARK OFFICE
CERTIFICATE OF CORRECTION

PATENT NO. : 11,239,980 B2
APPLICATION NO. : 16/338435
DATED : February 1, 2022
INVENTOR(S) : Zhang et al.

It is certified that error appears in the above-identified patent and that said Letters Patent is hereby corrected as shown below:

In the Specification

Column 26, Line 54, the formula reading $n_{cs,\lambda} = (n_{DMRS}^{(1)} + n_{DMRS,\lambda}^{(2)} + n_{PN}(n_s)) \bmod 12$ should read -- $n_{cs,\lambda} = \left(n_{DMRS}^{(1)} + n_{DMRS,\lambda}^{(2)} + n_{PN}(n_s)\right) \bmod 12$ --

Column 26, Line 55, the formula reading - $n_{DMRS,\lambda}^{(2)}$ - should read -- $n_{DMRS,\lambda}^{(2)}$ --

Column 26, Line 63, the formula reading - $n_{DMRS,\lambda}^{(2)}$ - should read -- $n_{DMRS,\lambda}^{(2)}$ --

Column 27, Line 4, the formula reading - $n_{DMRS,\lambda}^{(2)}$ - should read -- $n_{DMRS,\lambda}^{(2)}$ --

Column 27, Line 25, the formula reading - $n_{DMRS,\lambda}^{(2)}$ - should read -- $n_{DMRS,\lambda}^{(2)}$ --

Column 27, Line 44, the formula reading - $n_{DMRS,\lambda}^{(2)}$ - should read -- $n_{DMRS,\lambda}^{(2)}$ --

Column 28, Line 5, the formula reading - $n_{DMRS,\lambda}^{(2)}$ - should read -- $n_{DMRS,\lambda}^{(2)}$ --

Signed and Sealed this
Fifth Day of July, 2022

Katherine Kelly Vidal
*Director of the United States Patent and Trademark Office*